United States Patent
Aronovich et al.

(10) Patent No.: US 9,594,924 B2
(45) Date of Patent: *Mar. 14, 2017

(54) MANAGING GLOBAL CACHE COHERENCY IN A DISTRIBUTED SHARED CACHING FOR CLUSTERED FILE SYSTEMS

(71) Applicant: INTERNATIONAL BUSINESS MACHINES CORPORATION, Armonk, NY (US)

(72) Inventors: Lior Aronovich, Markham (CA); Yair Toaff, Giv'at Shmuel (IL); Gil Paz, Tel Aviv (IL); Ron Asher, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,259

(22) Filed: Jan. 19, 2016

(65) Prior Publication Data
US 2016/0210471 A1    Jul. 21, 2016

Related U.S. Application Data

(63) Continuation of application No. 14/264,944, filed on Apr. 29, 2014, now Pat. No. 9,251,075, which is a
(Continued)

(51) Int. Cl.
*G06F 12/08* (2016.01)
*G06F 17/30* (2006.01)
*G06F 21/62* (2013.01)

(52) U.S. Cl.
CPC ...... *G06F 21/6218* (2013.01); *G06F 12/0802* (2013.01); *G06F 12/084* (2013.01);
(Continued)

(58) Field of Classification Search
CPC ............ G06F 19/3475; G06F 19/3431; G06F 17/3053; G06F 21/6245; G06F 19/3437;
(Continued)

(56) References Cited

U.S. PATENT DOCUMENTS 4,300,192 A    11/1981    Couleur et al.
5,485,608 A    1/1996    Lomet et al.
(Continued)

OTHER PUBLICATIONS

Carter et al., "Techniques for reducing consistency-related communication in distributed shared-memory systems," ACM Transactions on Computer Systems (TOCS), v.13, n.3, p. 205-243, Aug. 3, 1995.
(Continued)

*Primary Examiner* — Jorge A Casanova
(74) *Attorney, Agent, or Firm* — Griffiths & Seaton PLLC

(57) ABSTRACT

Various embodiments are provided for managing a global cache coherency in a distributed shared caching for a clustered file system (CFS). The CFS manages access permissions to an entire space of data segments by using the DSM module. In response to receiving a request to access one of the data segments, a calculation operation is performed for obtaining most recent contents of one of the data segments. The calculation operation performs one of providing the most recent contents via communication with a remote DSM module which obtains the one of the data segments from an associated external cache memory, instructing by the DSM module to read from storage the one of the data segments, and determining that any existing contents of the one of the data segments in the local external cache are the most recent contents.

15 Claims, 29 Drawing Sheets

Related U.S. Application Data continuation of application No. 13/733,190, filed on Jan. 3, 2013, now Pat. No. 8,745,103, which is a continuation of application No. 13/567,217, filed on Aug. 6, 2012, now Pat. No. 8,510,351, which is a continuation of application No. 12/197,953, filed on Aug. 25, 2008, now Pat. No. 8,275,815.

(52) U.S. Cl.
CPC ...... *G06F 12/0815* (2013.01); *G06F 12/0828* (2013.01); *G06F 17/3007* (2013.01); *G06F 17/3048* (2013.01); *G06F 17/30091* (2013.01); *G06F 17/30115* (2013.01); *G06F 17/30132* (2013.01); *G06F 17/30194* (2013.01); *G06F 17/30203* (2013.01); *G06F 17/30227* (2013.01); *G06F 2212/604* (2013.01)

(58) Field of Classification Search
CPC ............. G06F 21/6218; G06F 17/3048; G06F 12/0802; G06F 12/0828; G06F 17/30091; G06F 12/0815; G06F 12/084; G06F 17/30203; G06F 17/30194; G06F 17/30227; G06F 17/30115; G06F 17/3007; G06F 17/30132; G06F 2212/604; G09B 19/00
USPC ........................................................ 707/826
See application file for complete search history.

(56) References Cited

U.S. PATENT DOCUMENTS

| | | | |
|---|---|---|---|
| 5,907,678 A | 5/1999 | Housel, III et al. |
| 6,078,930 A | 6/2000 | Lee et al. |
| 6,125,368 A | 9/2000 | Bridge et al. |
| 6,173,293 B1 | 1/2001 | Thekkath et al. |
| 6,192,365 B1 | 2/2001 | Draper et al. |
| 6,449,734 B1 | 9/2002 | Shrivastava et al. |
| 6,553,384 B1 | 4/2003 | Frey et al. |
| 6,560,609 B1 | 5/2003 | Frey et al. |
| 6,564,215 B1 | 5/2003 | Hsiao et al. |
| 6,766,471 B2 | 7/2004 | Meth |
| 7,039,663 B1 | 5/2006 | Federwisch et al. |
| 7,069,267 B2 | 6/2006 | Spencer, Jr. |
| 7,069,408 B2 | 6/2006 | Shimada et al. |
| 7,236,974 B2 | 6/2007 | Bhattacharjee et al. |
| 7,403,945 B2 | 7/2008 | Lin et al. |
| 7,418,544 B2 | 8/2008 | Mukherjee et al. |
| 7,433,896 B2 | 10/2008 | Owen et al. |
| 7,433,928 B1 | 10/2008 | Ranade et al. |
| 7,487,228 B1 | 2/2009 | Preslan et al. |
| 7,752,205 B2 | 7/2010 | McVeigh et al. |
| 7,774,469 B2 | 8/2010 | Massa et al. |
| 7,809,777 B2 | 10/2010 | Dodge |
| 2004/0044705 A1 | 3/2004 | Stager et al. |
| 2006/0123098 A1 | 6/2006 | Asher et al. |
| 2007/0088912 A1 | 4/2007 | Mukherjee et al. |
| 2007/0245085 A1 | 10/2007 | Hoshino et al. |
| 2008/0154980 A1 | 6/2008 | Lorenz et al. |
| 2008/0172429 A1 | 7/2008 | Lin et al. |

OTHER PUBLICATIONS

Keleher et al., "Lazy release consistency for software distributed shared memory," ACM SIGARCH Computer Architecture News, v.20, n.2, p. 13-21, Mar. 9, 1992.

Li et al., "Memory coherence in shared virtual memory systems," ACM Transactions on Computer Systems (TOCS), v.7, n.4, p. 321-359, Nov. 1989.

Nitzberg et al., "Distributed Shared Memory: A Survey of Issues and Algorithms," IEEE, v.24, n.8, p. 52-60, Aug. 1991.

Prabhakaran et al., "Analysis and Evolution of Journaling File Systems," Proceedings of the USENIX Annual Technical Conference, p. 1-16, Apr. 10, 2005.

Prelan et al., "A 64-bit, shared disk file system for Linux," Proceedings of the 16th IEEE Mass Storage Systems, p. 22-41.

Protic et al., "Distributed Shared Memory: Concepts and Systems," IEEE Parallel & Distributed Technology, v.4, n.2, p. 63-79, Summer 1996.

Stumm et al., "Algorithms Implementing Distributed Shared Memory," IEEE, v.23, n.5, p. 54-64, May 1990.

Tanenbaum, "Distributed Operating Systems," Prentice Hall, Inc., Chapters 5 and 6, p. 245-375, 1995.

| Entry # | 1 | ••• | N |
|---|---|---|---|
| Owner | | | |
| Permission | | | |
| Copies | | | |
| Usage | | | |
| Pending exclusives | | | |
| Message out | | | |
| Message ID local | | | |
| Message ID remote | | | |
| Data segment version | | | |
| No owner deadlock resolving indication | | | |
| Synchronization mechanisms | | | |

| Permission Request | Permission Response | Invalidation Request | Invalidation Response |
|---|---|---|---|
| data segment id | data segment id | data segment id | data segment id |
| requested permission | granted permission | message id remote | data segment version |
| message id local | data segment | data segment version | |
| message id remote | contents attainment | | |
| data segment version | ownership transfer | | |
| | local permission | | |
| | data segment version | | |

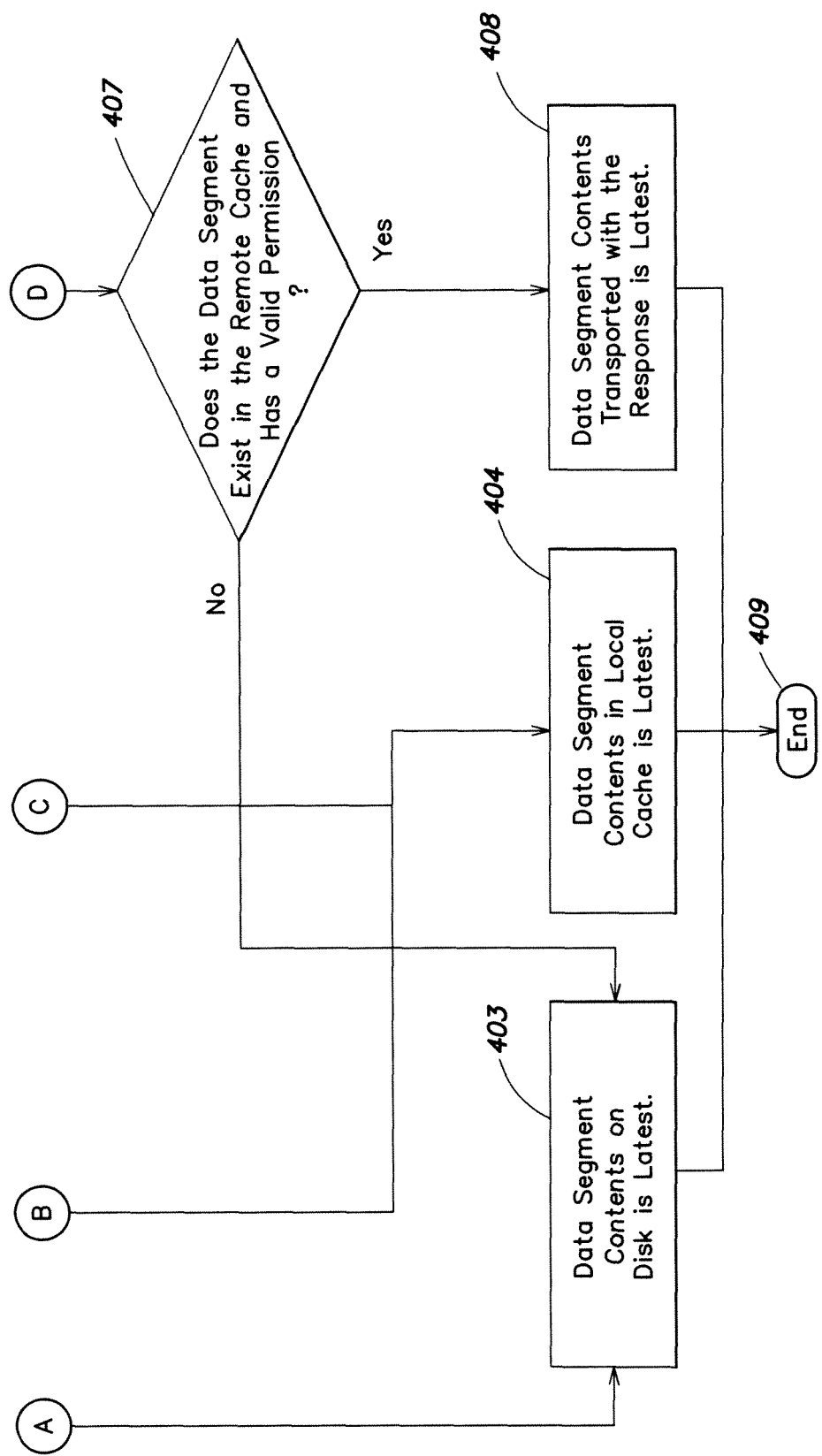

MANAGING GLOBAL CACHE COHERENCY IN A DISTRIBUTED SHARED CACHING FOR CLUSTERED FILE SYSTEMS

CROSS REFERENCE TO RELATED APPLICATIONS

The present Application is a Continuation of U.S. patent application Ser. No. 14/264,944 filed on Apr. 29, 2014, which is a Continuation of U.S. patent application Ser. No. 13/733,190, now U.S. Pat. No. 8,745,103, which is a Continuation of U.S. patent application Ser. No. 13/567,217, now U.S. Pat. No. 8,510,351, which is a Continuation of U.S. patent application Ser. No. 12/197,953, now U.S. Pat. No. 8,275,815, the contents of which are incorporated herein by reference.

FIELD OF THE INVENTION

The present invention relates to apparatus and methods for managing a global cache coherency in a distributed shared caching for a clustered file systems (CFS) in a clustered file system, implemented over a cluster of connected computers.

BACKGROUND

Distributed shared memory (DSM) provides an abstraction that allows users to view a physically distributed memory of a distributed system as a virtual shared address space. DSM provides a convenience for programmers of distributed applications, reducing or eliminating the requirement to be aware of the distributed architecture of the system and the requirement to use a less intuitive form of communication on a distributed system via message passing. DSM also provides a means to directly port software written for non-distributed systems to work on distributed systems.

There are many forms of DSM algorithms and technologies, all of them sharing a fundamental architecture of being composed of distributed agents deployed on a plurality of clustered nodes, maintaining local data structures and memory segments, and using a communication protocol over a message passing layer to coordinate operations. Message traffic should be minimized for a given load of work, and memory coherency should be maintained.

Users of a file system may need a transactional interface and method of operation for operating on files. Fundamentally, users may require that multiple updates applied on multiple segments within multiple files are associated with a single transaction, such that either all the updates within a transaction are applied to the files or alternatively none of the changes are applied. Further requirements may be the following: Enable to roll-back an ongoing transaction, by restoring the state of the files on which the transaction operated to the state preceding the beginning of the transaction. Upon confirmation of the file system on committing a transaction, the operations of the transaction are guaranteed to be durable and apply on the relevant files regardless of any fault that may occur after that confirmation. In case a fault occurs before a transaction is confirmed by the file system, it is guaranteed that no operations related to this transaction are applied on the relevant files, and the state is restored to the point after the last confirmed transaction. Furthermore, transactions are initiated concurrently by multiple users, and should be processed by the file system as concurrently as possible. Specifically, transactions that update disjoint portions of the file system should be processed concurrently, while transactions that share updated portions should be serialized. Moreover, users performing read only operations should be allowed to access the file system concurrently, while users performing transactions should be mutual exclusive and serialized with all other users that access the same file system portions affected by these transactions. Basically, all transactions should be isolated, in the sense that no operation external to a transaction can view the data in an intermediate state.

Existing file systems generally do not support these requirements. Known systems include journaling file systems where journal based transaction processing is applied to file system operations. Such file systems maintain a journal of the updates they intend to apply on their disk structures, and periodically apply these updates, via the checkpoint process, on the actual disk structures. After a systems fault, recovery involves scanning the journal and replaying updates selectively until the file system is consistent. However, in journaling file systems, the operations on which transactional consistency is applied are file system operations defined according to the file system logics, rather than user oriented operations applied to the file system. In other words, transactional processing in such file systems protects the atomicity, consistency, isolation and durability of file system operations, rather than user operations which are more complex.

Journaling file systems typically define a single write or update operation issued by a user as a transaction. Such an operation generally involves several internal update operations on file system metadata structures and user data structures. Occurrence of faults (like a power failure or a system unrecoverable fault) during processing of these internal operations can leave the file system in an invalid intermediate state. Grouping these internal operations into a transaction enables the file system to maintain its consistency, considering possible failures during processing, relative to individual user operations on the file system. However, the requirement of considering several user operations, defined and grouped by the user logic, as a single atomic transaction, and the subsequent requirements facilitating transaction processing of user oriented operations, remain unanswered in existing file systems. Some journaling file systems group several operations within a transaction, but this is done according to the file system logic and mechanisms, and without consideration of user logic. Journaling file systems also differ in the type of information written to the journal, which may be blocks of metadata and user data after the updates, or alternatively some other compact description of the updates.

Note that in non-journaled file systems, detecting and recovering from inconsistencies due to faults during processing requires a complete scan of the file system data structures, which may take a long time. In both journaled and non-journaled file systems users are blocked until the recovery process completes.

In clustered (a.k.a. shared disk) file systems, which provide concurrent read and write access for multiple clustered computers to files stored in shared external storage devices, transaction processing and consistency should be implemented over the cluster and is more challenging. For example, a clustered file system should typically support an on-line recovery process, where an operational computer in the cluster recovers the consistency of the file system, during normal work in the cluster, after failure of other computers in the cluster.

SUMMARY OF THE INVENTION

In one embodiment, a method is provided for managing a global cache coherency in a distributed shared caching for a clustered file systems (CFS) in a computing environment using a processor device. The CFS resides on a cluster of nodes for accessing space of data segments that are shared between the cluster of nodes. A cache of data segment slots on each of the cluster of nodes and a distributed shared memory (DSM) module, with no internal memory for the data segments on each of the cluster of nodes, are included in the CFS. The cache memory acts as an external memory. The CFS manages access permissions to an entire space of data segments by using the DSM module. In response to receiving a request to access one of the disk data segments, a calculation operation is performed for obtaining most recent contents of one of the disk data segment. The calculation operation performs one of providing the most recent contents via communication with a remote DSM module which obtains the one of the disk data segment from an associated external cache memory, instructing by the DSM module to read from storage the one of the data segments, and determining that any existing contents of the one of the disk data segment in the local external cache are the most recent contents.

In another embodiment, a computer system is provided for managing a global cache coherency in a distributed shared caching for a clustered file systems (CFS) in a computing environment using a processor device. The computer system includes a computer-readable medium and a processor in operable communication with the computer-readable medium. The processor provides for the CFS to reside on a cluster of nodes for accessing space of data segments that are shared between the cluster of nodes. A cache of data segment slots on each of the cluster of nodes and a distributed shared memory (DSM) module, with no internal memory for the data segments on each of the cluster of nodes, are included in the CFS. The cache memory acts as an external memory. The CFS manages access permissions to an entire space of data segments by using the DSM module. In response to receiving a request to access one of the disk data segments, a calculation operation is performed for obtaining most recent contents of one of the disk data segment. The calculation operation performs one of providing the most recent contents via communication with a remote DSM module which obtains the one of the disk data segment from an associated external cache memory, instructing by the DSM module to read from storage the one of the data segments, and determining that any existing contents of the one of the disk data segment in the local external cache are the most recent contents.

In a further embodiment, a computer program product is provided for managing a global cache coherency in a distributed shared caching for a clustered file systems (CFS) in a computing environment using a processor device. The computer-readable storage medium has computer-readable program code portions stored thereon. The computer-readable program code portions include a first executable portion provides for the CFS to reside on a cluster of nodes for accessing space of data segments that are shared between the cluster of nodes. A cache of data segment slots on each of the cluster of nodes and a distributed shared memory (DSM) module, with no internal memory for the data segments on each of the cluster of nodes, are included in the CFS. The cache memory acts as an external memory. The CFS manages access permissions to an entire space of data segments by using the DSM module. In response to receiving a request to access one of the disk data segments, a calculation operation is performed for obtaining most recent contents of one of the disk data segment. The calculation operation performs one of providing the most recent contents via communication with a remote DSM module which obtains the one of the disk data segment from an associated external cache memory, instructing by the DSM module to read from storage the one of the data segments, and determining that any existing contents of the one of the disk data segment in the local external cache are the most recent contents.

In accordance with the one embodiment of the invention, a method is provided which includes:
   providing a clustered file system (CFS) residing on a cluster of nodes for accessing a shared storage of file system data;
   providing a local cache memory on each node to reduce file system access to the shared storage and for processing modifications to the file system data; providing a distributed shared memory (DSM) agent on each node wherein:
   the DSM agents collectively manage access permissions to the entire space of file system data as data segments;
   the DSM agents utilize the distributed cache memories of the CFS as a virtual shared cache to provide transaction based modifications on data segments, for user defined operations and CFS defined operations.

In one embodiment, the DSM agents determine the latest contents of file system data to maintain coherency between the distributed cache memories of the CFS. In response to a user request to a local node, user operations are applied to data segments in the associated local cache memory, including reading requested data segments to the local cache memory and modifying data segments within the local cache memory, in accordance with permissions granted by the DSM agents. Users performing read only operations are allowed to access the file system data concurrently, while the operations of users that require access for modification of a same data segment are serialized.

In another embodiment, each node is provided with a journal for storing committed transactions generated by users on that node. In a commit operation, the modified data segments are written from the local cache memory to the transaction journal of the local node. In a checkpoint operation, the modified and committed data segments are written from the local cache memory to a final location in the shared storage. In a roll-back operation, for cancellation of a current transaction, data segments are written from the transaction journal to the associated local cache memory to restore the local cache memory to its state prior to the transaction. In a recovery operation, wherein upon failure of one or more nodes, data segments are written from the transaction journals of the failed nodes to their final locations in the shared storage, for recovering file system data.

In one embodiment, the DSM agents provide a global ordering of the recentness of transactions and data segment contents across the cluster. The global ordering may be based on a termination time for each transaction. The global ordering may be based on assignment of a transaction identifier which is unique, with respect to all other transaction identifiers existing in the CFS, at the time of a commit operation of a transaction.

In one embodiment, each node has a CFS agent for maintaining a local set of data segments in the local cache memory and associated local parameters which include an access permission and ownership by the local DSM agent.

In another embodiment, during a checkpoint operation, users that require access for modification of a data segment being written within the checkpoint operation, are provided with a shadow data segment, whose contents is identical to that of the original data segment used by the checkpoint operation. When the checkpoint operation completes, the shadow data segment replaces in local cache memory the original data segment used by the checkpoint operation.

In another embodiment, the method includes providing a list of data segments modified within an ongoing transaction. A roll-back procedure scans the list to identify the location of the latest contests of a data segment prior to the transaction.

More specifically, each node may have a local transaction journal for storing committed transactions generated by users on that node. Then, for each modified data segment the roll-back procedure identifies the location of the latest contents prior to the transaction by:

- if the data segment was marked as modified in the cache at the time it was inserted into the list, then the latest contents of this data segment appears only in the journal;
- otherwise, if the data segment was not marked as modified in the cache at the time it was inserted into the list, then the latest contents of this data segment appears in its final location in the shared storage;
- the type of each data segment being recorded in the list during insertion of the data segment into the list;

and wherein:

- all data segments in the list whose latest contents appear in their final location are discarded from the cache;
- for all the other data segments in the list, their latest contents is restored from the journal into the cache, by scanning the journal from its ending to its beginning and considering only the first occurrences of these data segments in the journal, and then setting their modification indication to true;
- and finally, the procedure releasing the exclusive permissions on all the data segments involved in the cancelled transaction.

In one embodiment, the recovery procedure scans concurrently the transaction journals of the one or more failed nodes, beginning with the latest complete transaction in each journal, and following a descending order of the recentness of the transactions. Only the most recent occurrence of each data segment is considered and, for each such data segment the procedure determines if it should be copied to its final location in shared storage by validating that ownership of the data segment is not associated with any of the remaining operational nodes.

In another embodiment, in a procedure for allocating a new data segment, wherein an associated cache data segment and metadata data segment are loaded into the cache memory and modified in the process of allocating the data segment, the cache data segment and metadata data segments are added to a list of data segments modified within the associated transaction, and the DSM agents then assign an exclusive permission on the newly allocated data segment. In a procedure for de-allocating an already allocated data segment, the procedure insures that there is an active exclusive permission on the de-allocated disk data segment. The procedure removes the de-allocated data segment from the list of data segments modified within the associated transaction and inserts into the list metadata data segments that were modified in the process of de-allocating the data segment.

In another embodiment, in a procedure for marking a retrieved data segment as modified, the procedure inserts the data segment into a list of data segments modified in the associated transaction, accompanied with an indication of whether this data segment was marked as modified before this operation.

In other embodiments of the invention, systems and computer program products are provided which implement the previously described method embodiments.

BRIEF DESCRIPTION OF THE DRAWINGS

Several embodiments of the present invention are described hereinafter with reference to the drawings, in which:

FIG. 2 is an embodiment of a data structure for DSM table entries;

FIG. 3 is one embodiment of type and data structures for DSM messages;

FIG. 18B is a continuation of FIG. 18A of a flow diagram of a procedure for determining the latest contents of the data segment;

DETAILED DESCRIPTION

Figure 1:
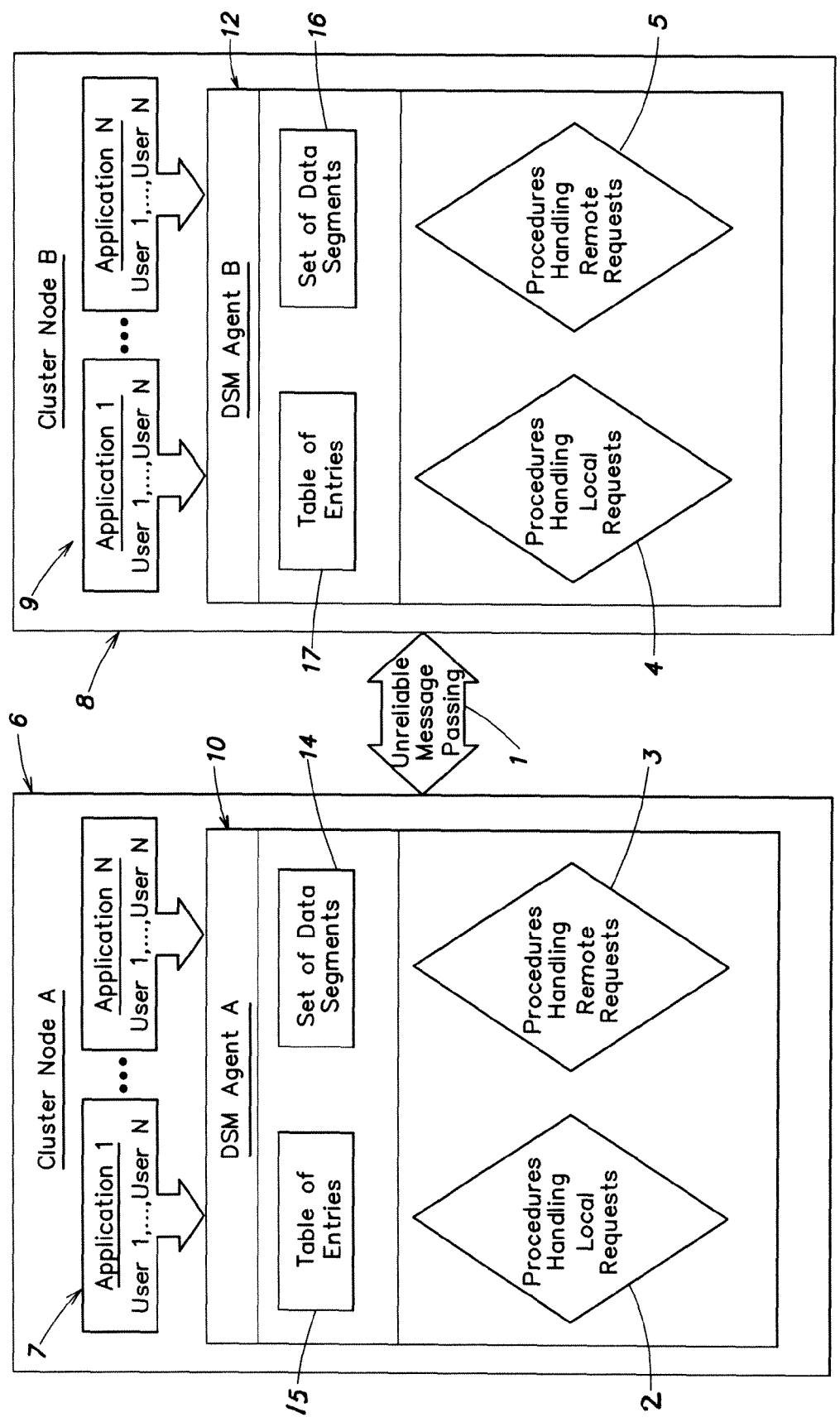
FIG. 1 shows schematically a system for implementing a distributed shared memory in accordance with one embodiment of the invention in which DSM Agents A and B reside on different clustered nodes A and B and communicate via an unreliable message passing layer.
Figure 4:
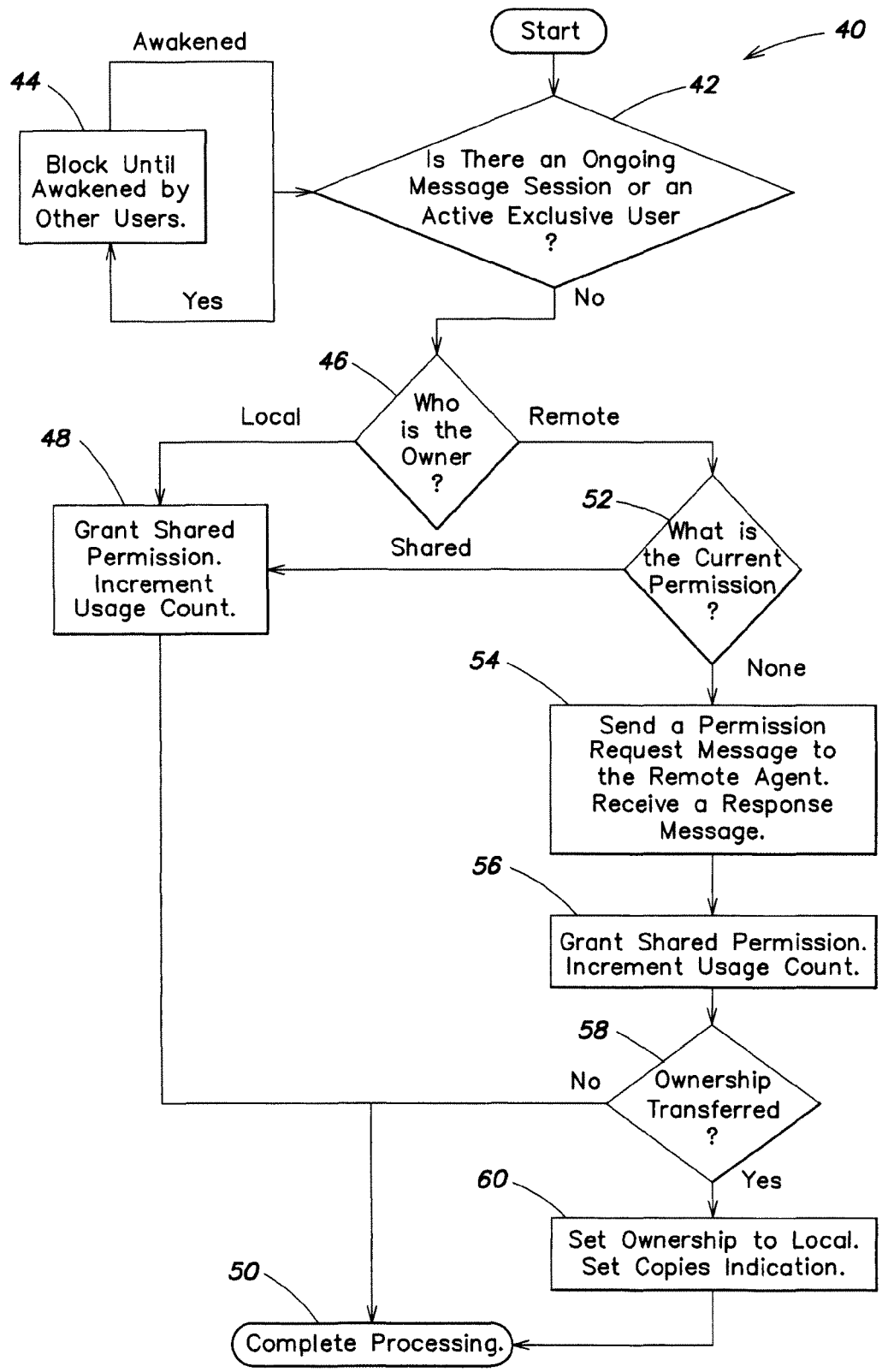
FIG. 4 is a flow diagram of a procedure for granting shared permission to a local user, according to one embodiment of the invention.
Figure 5A:
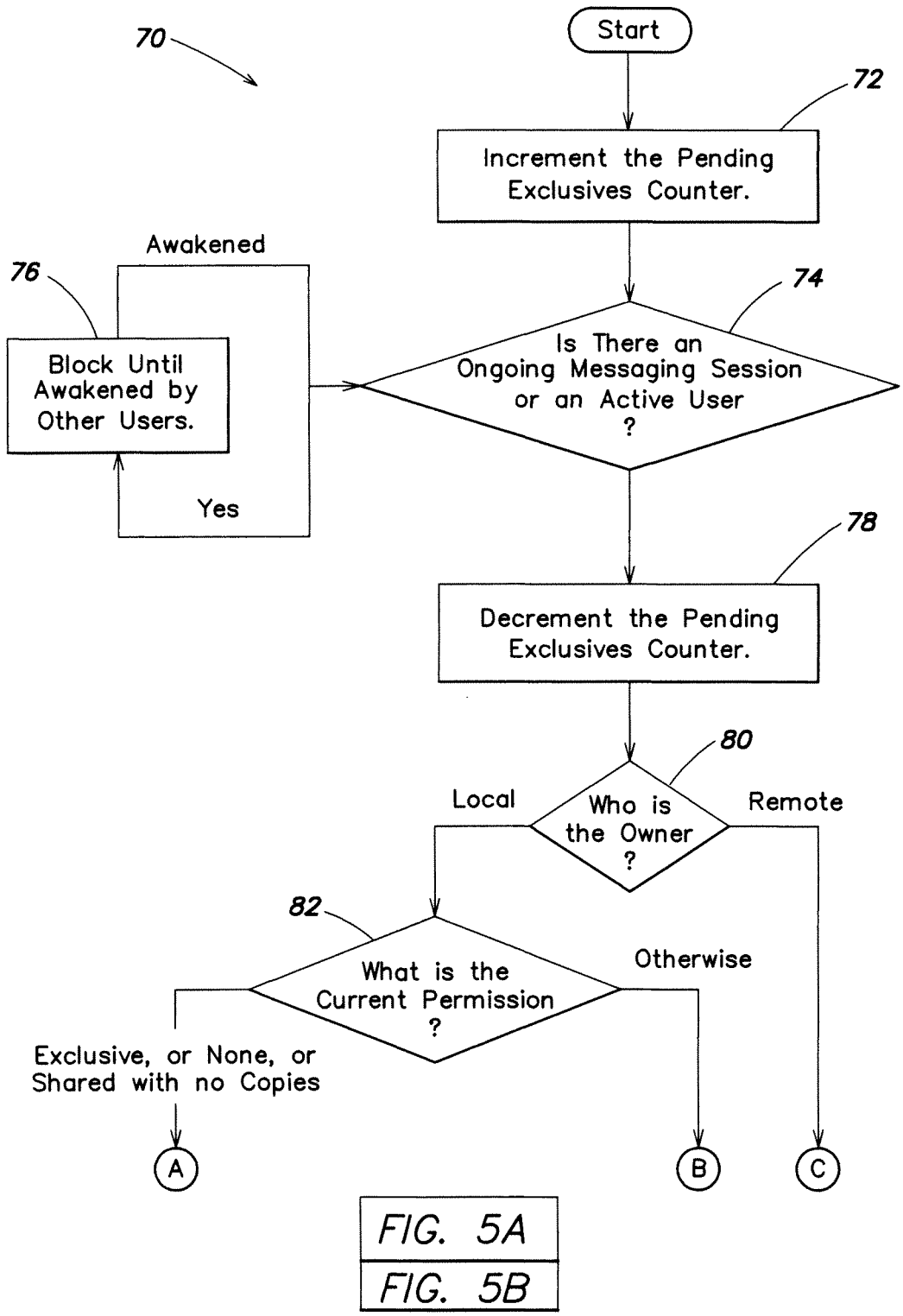
FIG. 5A is a flow diagram of a procedure for granting exclusive permission to a local user, in accordance with one embodiment of the invention.
Figure 5B:
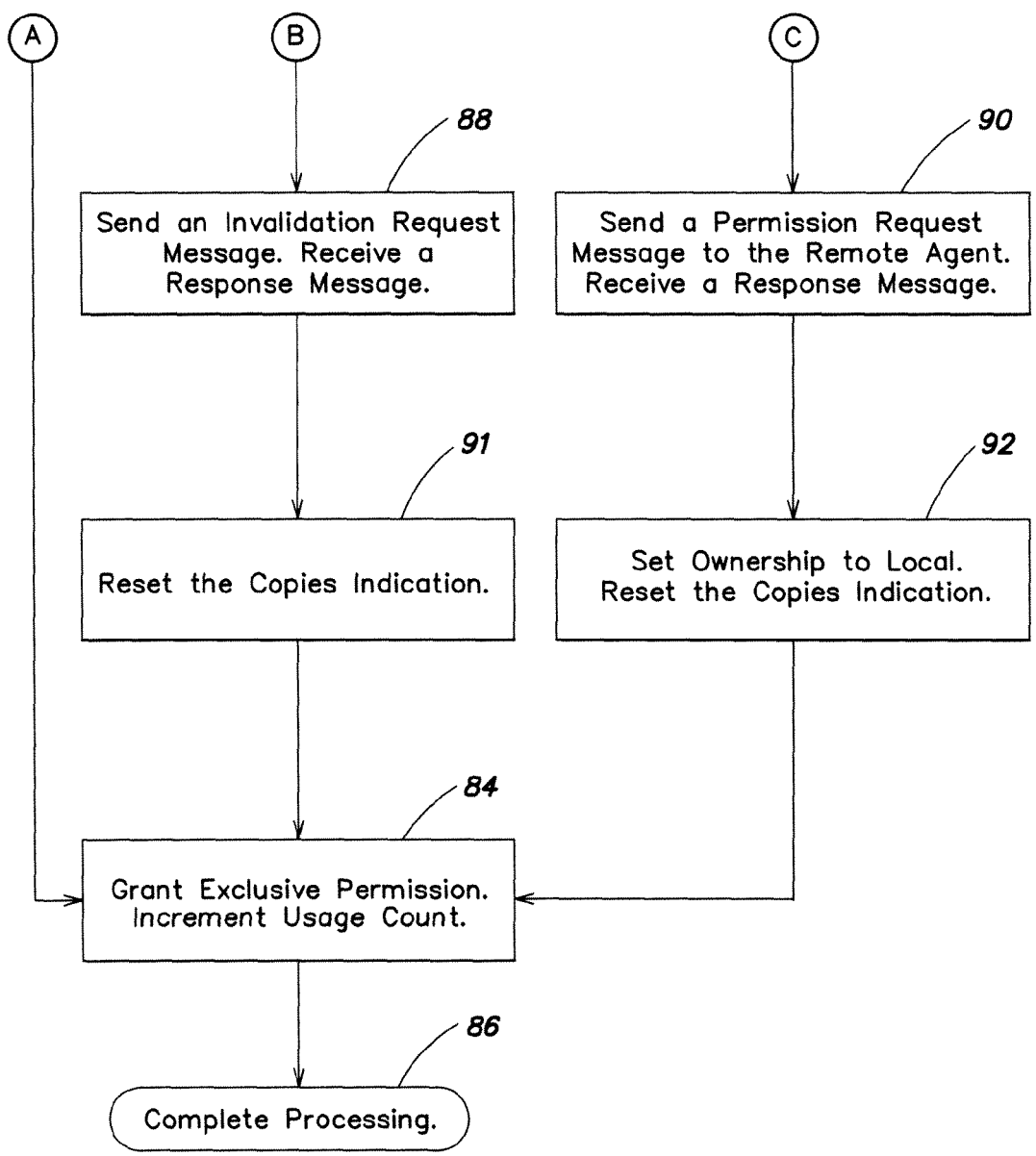
FIG. 5B is a continuation of FIG. 5A of a flow diagram of a procedure for granting exclusive permission to a local user, in accordance with one embodiment of the invention.
Figure 6:
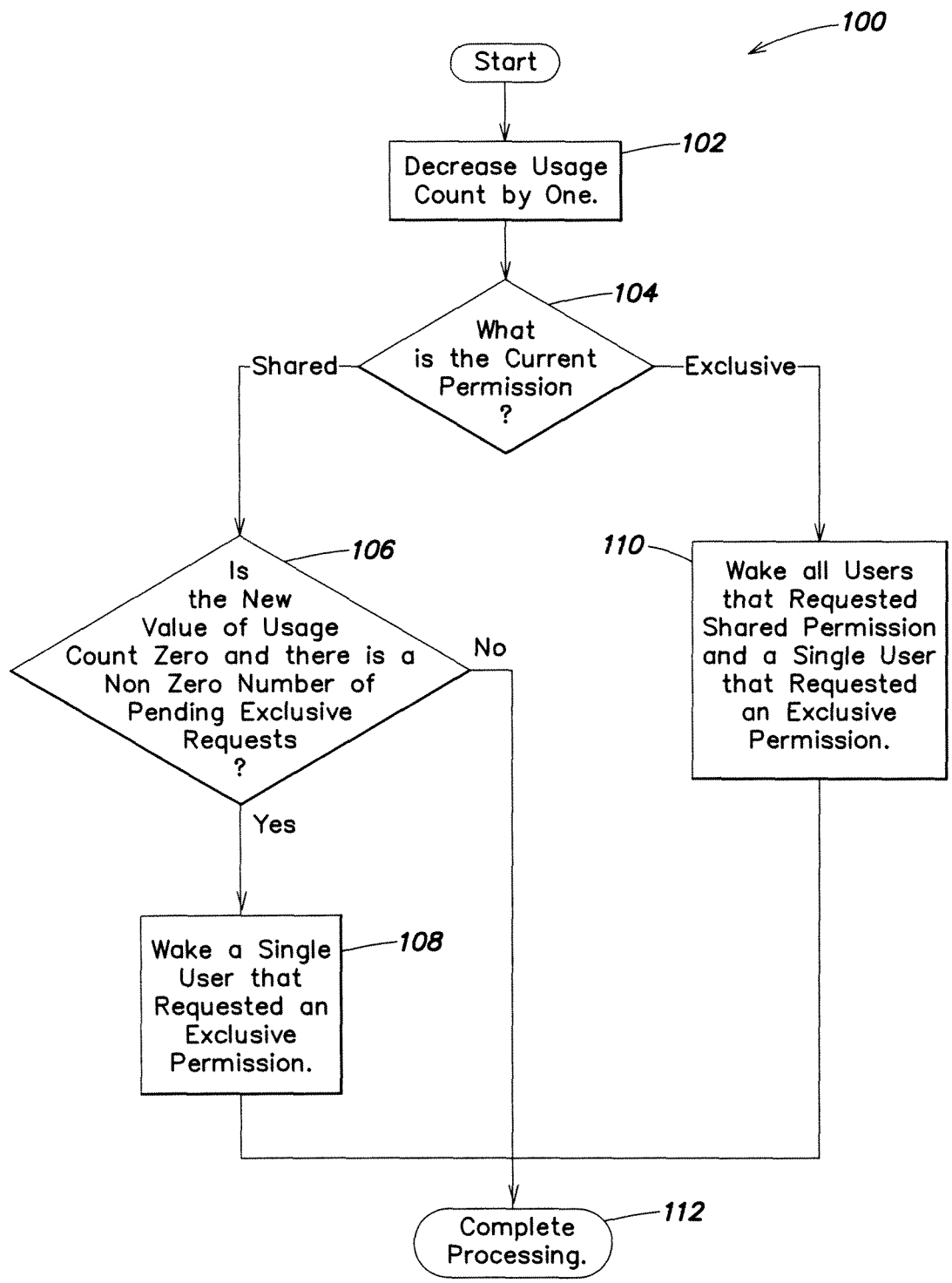
FIG. 6 is a flow diagram of a procedure for notification of completion on usage of a local user, in accordance with one embodiment of the invention.
Figure 7:
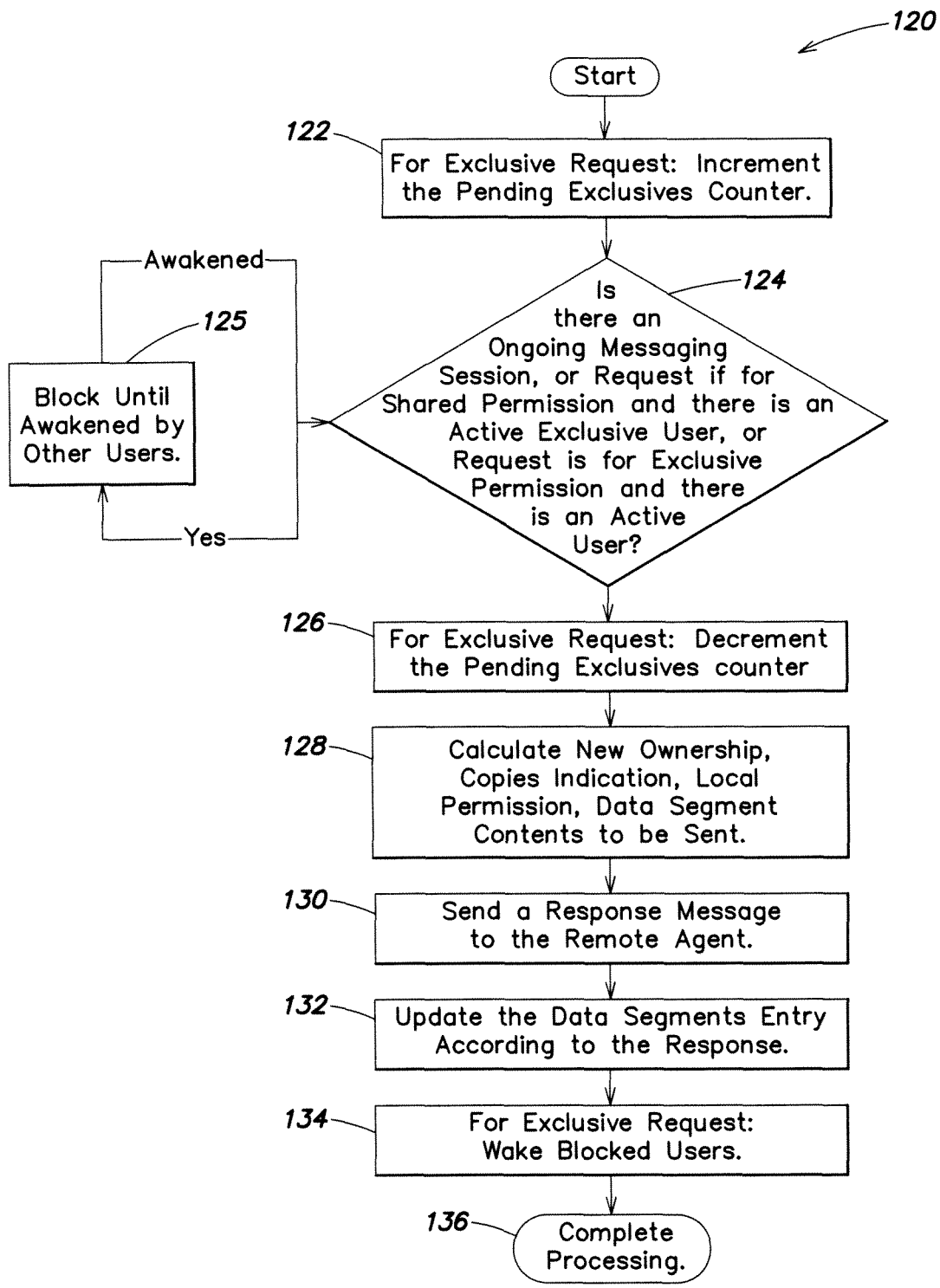
FIG. 7 is a flow diagram of a procedure for processing a permission request from a remote user, in accordance with one embodiment of the invention.

In accordance with various embodiments of the present invention, systems and method for transactional processing are provided within a clustered file system (CFS) which utilizes a distributed shared memory (DSM). For ease of understanding, various embodiments of the DSM and CFS will first be described separately (Sections A and B), followed by a description of various embodiments of the transactional processing (Section C).

A-1. Distributed Shared Memory (DSM)

Various embodiments of a DSM algorithm and technology will now be described which assume an unreliable underlying message passing layer. Therefore, uncertainty exists regarding whether a message sent has reached its designation (possibly with delays) or not, and there is no feedback provided on the fate of each message. It is further assumed that there is no order on the reception of messages relative to the order of their generation or sending. Given these assumptions, the DSM algorithm is able to efficiently maintain memory coherency.

In understanding the described embodiments, the following definitions may be useful:

Computer cluster. A group of connected computers, assumed in various embodiments to be working together and thus forming in several respects a single computational unit; such clusters typically provide improved performance and/or availability.

Distributed shared memory. A technology providing an abstraction that allows users to view a physically distributed memory of a distributed system as a virtual shared address space. Abbreviation: DSM.

Memory coherency. The integrity of data stored in the distributed memories comprising a virtual shared memory. Generally, all users accessing the virtual shared memory, performing both read and write operations, must be provided with a consistent and serialized view of the data stored in the virtual shared memory.

User of a distributed shared memory. A procedure that uses DSM, and is executed by a specific thread of operation within a computer application.

Data segment. A memory unit of arbitrary fixed or variable size. The entire memory space of a DSM is partitioned into data segments.

Permission to access a data segment. A user may obtain permission to access a specified data segment, atomically with respect to all other users on all nodes sharing the DSM. The permission may be shared, namely the data segment may be only read. This permission can be obtained concurrently by multiple users with respect to a data segment. Alternatively the permission may be exclusive, namely the data segment may be also modified. This permission is mutual exclusive with all other users with respect to a data segment. A valid permission is either a shared or an exclusive permission.

Mutual exclusion. Conditions according to which users are either permitted to access data segments or alternatively blocked, due to access permissions concurrently held by other users. Specifically, a request for shared access permission on a data segment must block as long as there is a user holding an active exclusive access permission on that data segment, or there is a pending user waiting for exclusive access permission on that data segment (under certain conditions). A request for exclusive access permission on a data segment must block as long as there is another user with an active permission on that data segment.

Upgrade of permission. An operation of switching from no permission to shared or exclusive permission on a data segment, or switching from shared permission to exclusive permission on a data segment.

Ownership of a data segment. Each data segment is owned at any given time by no more than one of the DSM agents. The identity of the owner of each data segment (i.e. local or remote) is recorded by each agent in the data segment's entry. Ownership of a data segment may be transferred to another node, as a result of processing user requests. The owner of a data segment serializes processing of requests issued in parallel for that data segment, and has complete knowledge on the whereabouts of the latest contents of that data segment. When a user requires an upgrade of permission on a specific data segment, a request must be issued to the owner of that data segment if the owner is remote.

Message passing. A form of communication, commonly used in distributed and clustered computing, based on sending of messages to recipients.

Messaging session. A communication between the DSM agents, with regard to a data segment, comprising a request message from agent A to agent B and a subsequent response message from agent B to agent A. A messaging session is terminated upon reception of a response from the other agent or when the operation within which the request was sent times out. A single messaging session is allowed per data segment at a time.

A-2. DSM Agents, Table Entries, Data Fields, and Permissions

In accordance with one embodiment, the DSM technology (FIG. 1) consists of two agents 10 (DSM Agent A) and 12 (DSM Agent B), each residing on a different one of the clustered nodes A and B (6, 8 respectively), each node having a set of local applications (users) 1 to N (7, 9 respectively), and each agent using a local set of memory data segments 14, 16 and an associated table of entries 15, 17, wherein each data segment is associated with an entry. The DSM agents A and B each have procedures 2, 4 for handling their respective local requests 7, 9, i.e., issued by local users (applications) 1 through N, and procedures 3, 4 for handling remote requests (from the other agent) via an unreliable message passing layer 1 [Therese: My understanding is that the message passing layer is unreliable but the proposed protocol is reliable].

The entire memory space of the DSM is partitioned into data segments of arbitrary fixed or variable sizes. A user may obtain permission to access a specified data segment, atomically with respect to all other users on all nodes sharing the DSM. The permission may be shared, namely the data segment may be only read. This permission can be obtained concurrently by multiple users with regard to a data segment. Alternatively the permission may be exclusive, namely the data segment may be also modified. This permission is mutual exclusive with all other users with regard to a data segment. A valid permission means either shared or exclusive permission. The latest permission for each data segment is recorded by each agent 10, 12 within its respective table of entries 15, 17. Permissions are modified only due to user requests.

Each data segment has an owner, which is set to be one of the two DSM agents 10, 12. The owner's identify for each data segment (i.e. local or remote) is recorded by each agent in the data segment's entry (in tables 15, 17). When a user requires an upgrade of permission on a specific data segment, a request must be issued to the owner of that data segment if the owner is remote. The owner of a data segment serializes processing of requests issued in parallel for that data segment, and has complete knowledge on the whereabouts of the latest contents of that data segment. Ownership of a data segment may be exchanged between the agents, triggered by processing of user requests, in the following cases: a) when a user is given exclusive permission on a data segment, the agent of its node is set to be the owner of that data segment; b) when a user is given shared permission on a data segment and the remote owner does not have any permission on that data segment, the agent of the node of the requesting user is set to be the owner of that data segment.

To facilitate the DSM algorithm, each DSM agent maintains a local table of entries. An example of a data structure 25 for the DSM table of entries is illustrated in FIG. 2. Each entry is associated with a data segment, and consists of the following data fields:

Owner—indicates whether the current owner of the data segment is local or remote;

Permission—indicates the local permission on the data segment (may be none, shared or exclusive);

Copies—set to true if the local agent is the owner of the data segment and the remote agent has a copy of the data segment, otherwise set to false;

Usage—indicates the number of users currently using the data segment on the local node. This counter is incremented when a user receives a permission on the data segment, and decremented when a user having a valid permission notifies on termination of usage.

Pending Exclusives—indicates the number of pending exclusive requests on the data segment on the local node. This counter is desirable in order to avoid starvation of users requesting exclusive permission, in a case where there is an endless stream of sequential users requesting shared permission. When a user requesting an exclusive permission has to block due to mutual exclusion, this counter is incremented thus informing other users on this pending request, and decrements this counter after clearing mutual exclusion. Users requesting shared permission block in certain conditions if this counter is non-zero.

Additional fields, described herewith, are used to facilitate detection and resolving of messaging deadlock situations, and to recover the latest contents of data segments, as elaborated in the next sections:

Message Out—indicates the type of request message concerning the data segment that was sent to the remote agent and not responded yet. If there is no ongoing messaging session, this field is set to a null value.

Message Id Local, Message Id Remote—indicate the latest ids of messages, concerning the data segment, generated by the local agent and received from the remote agent correspondingly.

Data Segment Version—indicates the version number of the data segment contents stored at the local agent.

No Owner Deadlock Resolving Indication—used to prevent redundant deadlock resolving threads for a data segment which is in a state of no owner.

To facilitate efficient scalability in terms of the number of data segments managed by the DSM agents, the table of entries should be compact, meaning that the values of each field are encoded so that each field is allocated with a minimal number of bits.

Each entry is also augmented with four synchronization mechanisms. One mechanism facilitates mutual exclusion for accessing the entry's fields. The other three mechanisms enable synchronized blocking and awakening for users that identify mutual exclusion conditions that necessitate their blocking; more specifically, one is for users seeking shared permission, a second is for users seeking exclusive permission, and a third is for users that identify an ongoing messaging session.

When a user requires a permission, which entails upgrading the current permission held by its local agent on the requested data segment (upgrading means switching from no permission to shared or exclusive permission on a data segment, or switching from shared permission to exclusive permission on a data segment), a message may be sent to the remote agent to coordinate processing of the request. There are four types of messages between DSM agents:

Permission request: Sent from a non-owner agent to the agent holding ownership of a data segment, in order to upgrade permission on that data segment.

Permission response: Sent from an agent holding ownership of a data segment to the remote agent, granting to the remote agent the requested permission.

Invalidation request: Sent from an agent holding ownership of a data segment to the remote agent, in a case where the owning agent requires to upgrade its permission from shared to exclusive, and the remote agent may hold valid copies of that data segment.

Invalidation response: Sent from a non-owner agent to the agent holding ownership of a data segment, acknowledging invalidation of the requested data segment.

FIG. 3 illustrates one embodiment of data structures 26 for each of these requests and associated responses for DSM messaging.

When processing a request for permission from a local or remote user (via a message), the handling procedure must first check for any conditions that entail it to block, and it may not proceed until the blocking conditions are cleared.

One condition for blocking is mutual exclusion. Namely, a request for shared access permission on a data segment must block as long as there is a user holding active exclusive access permission on that data segment, or there is a pending user waiting for exclusive access permission on that data segment (this applies under certain conditions). A request for exclusive access permission on a data segment must block as long as there is another user with an active permission on that data segment. In addition to mutual exclusion conditions, a handling procedure must block as long as there is an ongoing messaging session (indicated by the Message Out field). A messaging session is terminated upon reception of a response from the remote agent or when the operation within which the request was sent times out. This enables to maintain a single messaging session per data segment at a time.

Further details of the DSM handling procedures are explained below.

A-3. DSM Handling Procedures

Several handling procedures are defined within the DSM algorithm. These procedures are described below with reference to FIGS. 4-7.

A procedure 40 for handling a request of a local user for shared permission (FIG. 4) checks 42 first the blocking conditions, as specified earlier, and blocks 44 until these conditions are cleared. If ownership is determined 46 to be local, a shared permission is granted by the local agent and the usage count is incremented by one 48 and the procedure terminates 50. If ownership is determined 46 to be remote and the local agent is determined 52 to hold shared permission on the data segment, the usage count is incremented by one 48 and the procedure terminates 50. If ownership is determined 52 to be remote and the local agent does not hold a valid permission, a message is sent 54 to the remote agent requesting shared permission on that data segment. When a response is received, with the latest data segment contents, shared permission is granted and the usage count is incremented by one 56. According to the response, ownership of the data segment may be also transferred 58. In this case the local agent records its ownership and the copies indication is set 60 to true if the remote agent keeps shared permission or false otherwise, and the procedure terminates 50.

A procedure 70 for handling a request of a local user for exclusive permission (FIG. 5) checks 74 first the blocking conditions, as specified earlier, blocking 76 until these conditions are cleared. The pending exclusive counter is incremented 72 before checking these conditions and decremented 78 after clearing them. If ownership is determined 80 to be local and it is determined that 82 the local agent has an exclusive or no permission or shared permission without copies of the data segment, then an exclusive permission is granted 84 by the local agent and the usage count is incremented by one 84, and the procedure terminates 86. If ownership is determined 80 to be local and the local agent has a shared permission with copies, then a message is sent 88 to the remote agent requesting to invalidate its copies. Upon reception of a response 88 the copies indication is set 90 to false, an exclusive permission is granted by the local agent and the usage count is incremented by one 84 and the procedure terminates 86. If ownership is determined 80 to be remote, a message is sent 90 to the remote agent requesting an exclusive permission on the data segment. Upon reception of a response 90, with the latest data segment contents, an exclusive permission is granted (resetting the copies field), ownership is set to the local agent and the usage count is incremented by one 92, and the procedure terminates 86.

A procedure 100 for handling a local user notification of termination of usage of a data segment (FIG. 6) decreases by one the usage count of that data segment 102. If the permission on that data segment is determined 104 to be shared and it is determined 106 that the new value of the usage count is zero and there is a non-zero number of pending exclusive requests, then a single blocked user that issued an exclusive request on that data segment is awakened 108, and the procedure terminates 112. If the permission on that data segment is determined 104 to be exclusive then all blocked users that issued a shared request and a single blocked user that issued an exclusive request (if it exists) on that data segment are awakened 110, and the procedure terminates 112.

A procedure 120 for handling a message sent by a remote user requesting permission on a data segment (FIG. 7) checks 124 first the blocking conditions, as specified earlier, blocking 125 until these conditions are cleared. If the request is for exclusive permission, the pending exclusive counter is incremented 122 before checking these conditions and decremented 126 after clearing them. A response is then sent 130 to the requesting agent and the data segment's entry is updated 132, based on the following calculations 128. Ownership is transferred if the request is for exclusive permission, or the request is for shared permission and the local agent does not have a valid permission on the data segment. The copies field is reset if the ownership is transferred. The local permission is invalidated if the request is for exclusive permission or there is no current valid permission. Otherwise the local permission is set to shared. The data segment contents is sent if there is current valid permission on that data segment. In addition, in case the request is for exclusive permission blocked users are awakened 134, and the procedure terminates 136, so that one of the unblocked users shall send a request to the remote owner.

The procedure for handling a message sent by a remote user requesting invalidation of a shared permission on a data segment checks first the blocking conditions 124, as specified earlier, blocking 125 until these conditions are cleared. The pending exclusive counter is incremented 122 before checking these conditions and decremented 126 after clearing them. However, since there may be a deadlock between an invalidate request (from owning agent to non-owning agent) and a permission request (from non-owning agent to owning agent), the procedure handling the invalidation request is defined to resolve such a deadlock, by avoiding blocking due to an ongoing messaging session in case such a deadlock is identified (the method for identification is specified in the following sections). After clearing the blocking conditions the local permission is invalidated, blocked users are awakened, so that one of them shall sent a request to the remote owner, and a response acknowledging the invalidation is the sent to the requesting agent.

A-4. Support of Unreliable Message Passing

Because real-life message passing technologies are unreliable, assuming full reliability of an underlying message passing technology would expose a DSM technology to a non-zero probability of data corruption. The DSM algorithm and technology of the present embodiment supports unreliable message passing technologies. It assumes complete uncertainty on whether a message that is sent reaches its destination (possibly with delays) or not, and assumes there is no feedback on the fate of each message. It further assumes no ordering on the reception of messages relative to the order of their generation or sending. Given these assumptions, the present DSM algorithm efficiently maintains consistency both of user and internal data, and does not require additional messages nor run-time for this support.

Given an underlying unreliable message passing technology, the following problems arise and should be resolved:
- a) Ownership of a data segment may be lost when a message, sent in response to a permission request, carries a transfer of ownership and the message is lost or delayed. Note that the agent sending such a response waives its ownership regardless of the fate of the response. Since most operations require a valid owner for a data segment, the owner should be recovered;
- b) It must be ensured that a data segment never has two owners, since such a situation may cause data corruption; and
- c) Since the owner of a data segment has complete knowledge of the whereabouts of the latest contents of the data segment, if ownership is lost this knowledge is also lost, and should be recovered.

A-5. Recovering Ownership of a Data Segment

Consider the first and second problems. When ownership of a data segment is lost, the present DSM algorithm employs the following protocol for recovering the ownership, ensuring that there are no two owners of a data segment. In the initial state both agents are not owners of the considered data segment, and thus assume that the other agent is the owner. The basic idea is that ownership can not be taken by an agent; it can only be given by the other agent. When an agent receives a request addressed to the owner of a data segment (i.e. a permission request), and that agent is not recorded as the owner in its local entry of the data segment, it deterministically concludes that there is currently no owner of that data segment cluster-wide, and it gives ownership of that data segment to the other agent within the response it sends. If this response reaches the other agent, in a time frame by which the user that triggered sending the request is still waiting for the response, the agent that receives the response becomes the new owner of the data segment. In case a response is received when the user that triggered sending the request is no longer waiting for the response (i.e. the user timed out), this response is discarded, regardless of its contents.

Figure 8:
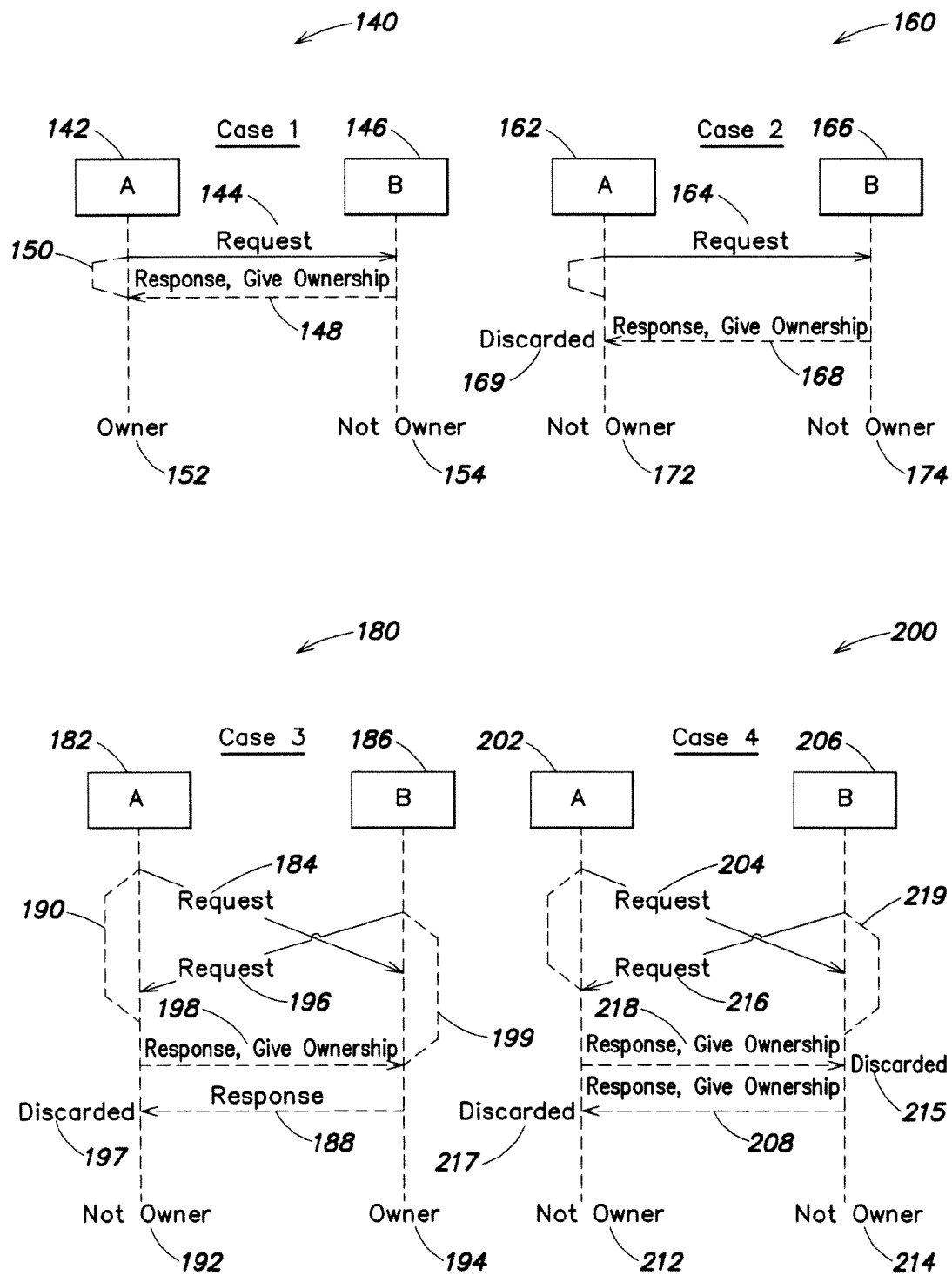
FIG. 8 is a schematic illustration of four case scenarios relating to a protocol for recovering ownership of a data segment among the DSM agents, in accordance with various embodiments of the invention.

This protocol ensures that a data segment never has two owners, since it is impossible that the two agents receive ownership of a data segment from each other at the same time, as further elaborated. Recall that an agent may send only one request per data segment at a time. Consider the following four (4) cases illustrated in FIG. 8:

Case 1 (140): Agent A 142 sends a request 144 that reaches agent B 146 before B sends any request on that data segment. In this case agent B sends a response 148 (giving ownership to agent A), that reaches agent A while the relevant user is still waiting 150 for the response (a requesting local user of A has not timed out). Agent A becomes the new owner 152, and agent B remains not an owner 154.

Case 2 (160): This case is similar to case 1, except that the response 168 sent by agent B 166 reaches agent A 162 after the wait period 170 of the relevant user has timed out, thus the response 168 is discarded 169. Therefore, both agents are not the owners 172, 174 of the data segment.

Case 3 (180): Agent A 182 sends a request 184 that reaches agent B 186 after B sends a request 196 on the same data segment. Both requests 184, 196 become blocked on the remote side as their handling procedures identify an ongoing messaging session. One of the two users that triggered sending the requests times out and the agent of the timed out user eventually processes the request of its counterpart agent and sends a response. Assume without loss of generality that the user timing out 190 is affiliated with agent A, the response 198 reaches the user affiliated with agent B before timing out 199, in which case only agent B becomes the owner 194, since agent A shall discard 197 the response 188 to the original request 184 of agent A.

Case 4 (200): This case is similar to case 3, except that the response 218 from agent A 202 reaches the user affiliated with agent B 206 after timing out 219, in which case both responses 218, 208 sent by both agents are discarded 215, 217 by their remote agents. Therefore both agents are not the owners 212, 214 of the data segment.

A-6. Resolving a No Owner Messaging Deadlock

In the scenario of case 4, both agents 202, 206 send concurrent permission requests 204, 216 on a same data segment not owned by both, and both responses 208, 218 are discarded 217, 215, thus failing both requests and failing to recover ownership of that data segment 212, 214. This scenario is referred to as a no owner messaging deadlock. Data segments that are accessed with high contention from both agents, for which ownership is lost, may exhibit sequentially repeating occurrences of this scenario, thus detrimentally affecting performance. To improve performance the DSM algorithm of the present embodiment employs a procedure 220 illustrated in FIG. 9 which deterministically detects whether such a deadlock occurs, and upon detection one agent resolves the deadlock. Noting that detection of such a deadlock must be deterministic; otherwise both nodes may receive ownership of a data segment, causing data corruption.

Figure 9:
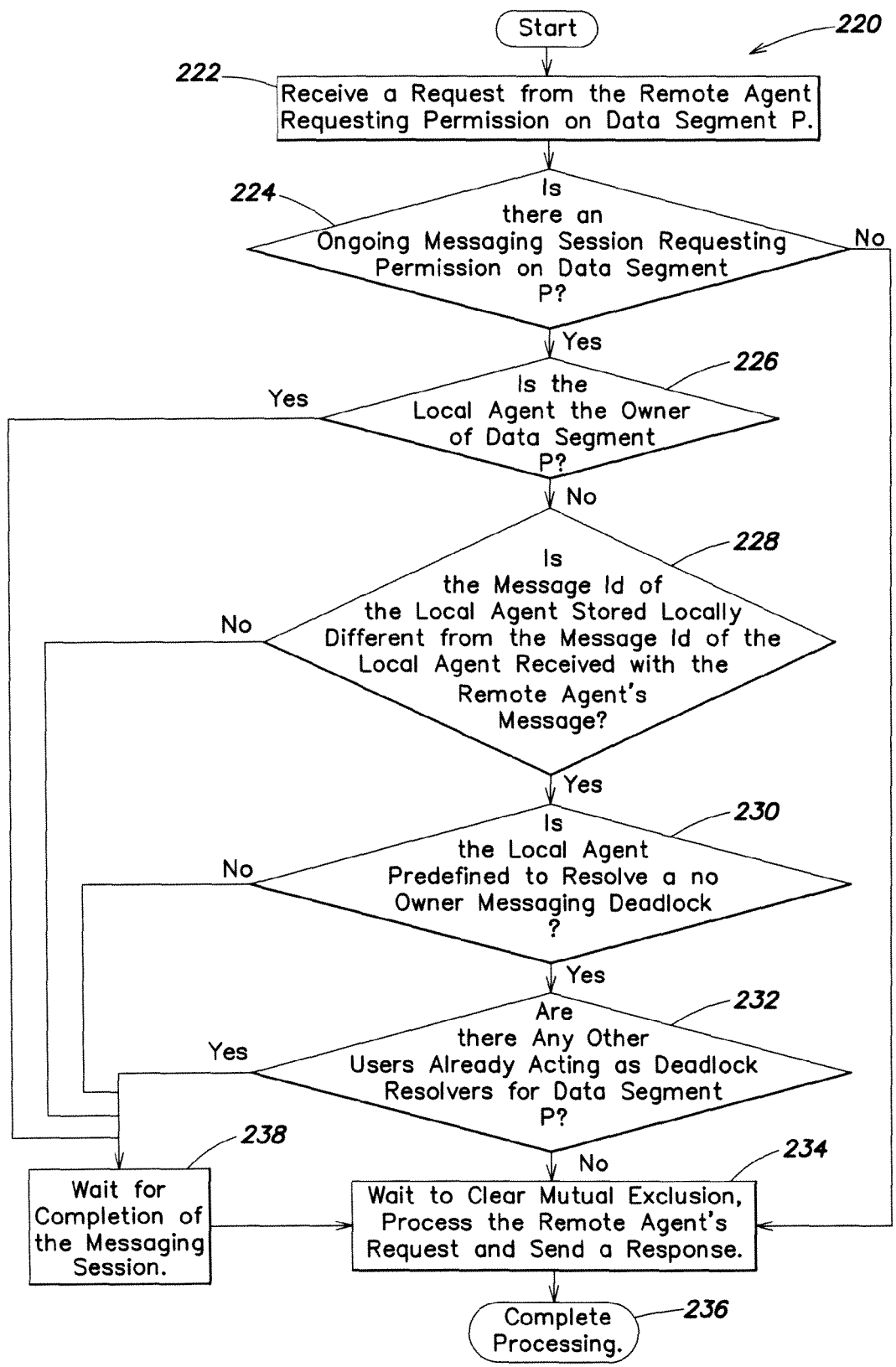
FIG. 9 is a flow diagram of a procedure for detecting and resolving a no owner messaging deadlock, according to one embodiment.

As shown in FIG. 9, such a deadlock is detected by an agent A when, upon receiving 222 and processing 224-236 a message of agent B requesting permission on a data segment P, the following conditions are determined to be true:
- a) Agent A is not the owner of data segment P (determining step 226 based on the entry's owner field);
- b) There is currently an ongoing messaging session requesting permission on data segment P (determining step 224 based on the entry's message out field);
- c) Agent B did not see agent A's permission request message before sending its permission request message (determining step 228 based on the entry's message Id field);

While the calculations of conditions a and b are more straightforward, the calculation and associated logic required for condition c requires some elaboration, which is given in the next section.

Upon detection of such a deadlock, only one predetermined agent (determining step 230), and only a single user operating via the one predetermined agent on data segment P (determining step 232 based on the entry's no owner deadlock resolving indication field) may enter the deadlock resolving protocol. The handling procedure of this single user within the predetermined agent avoids waiting for completion of the messaging session, and sends 234 a response, thus resolving the deadlock, and the procedure thereafter terminates 236. Meanwhile, the other users operating via both agents have waited 238 for completion of the messaging session.

A-7. Detection and Resolving of Messaging Deadlocks

Messages arrive at their destination with an arbitrary order relative to the order in which they were generated or sent. A messaging deadlock situation occurs when both agents concurrently send a request message on the same data segment before seeing the requests of their counterparts. Since processing of all local and remote requests on that data segment is blocked until the messaging sessions complete, such a sequence creates a messaging deadlock.

There are two types of messaging deadlocks in the context of the present DSM algorithm. One type is the no owner messaging deadlock described in the previous section. Another type is a deadlock termed permission/invalidation messaging deadlock, where the agent set as the owner of a data segment requires to upgrade the data segment's permission from shared to exclusive, and the non-owning agent also requires to upgrade the data segment's permission. Thus, the owning agent sends an invalidation request, and the non-owning agent sends a permission request. If both requests are sent before receiving and seeing the remote agents' requests, a deadlock is formed.

To identify messaging deadlocks, the present DSM algorithm employs a message id mechanism described herewith. Note that identification of the deadlock must be deterministic, otherwise data corruption may occur. Each agent maintains two message ids for each data segment—one id for the local agent and the second id for the remote agent. When an agent generates a message, an associated locally unique message id is generated and recorded in the message id local field of the data segment's entry. Messages are augmented with the values of the message ids (local and remote) stored in the relevant data segment's entry. When a message from the remote agent is handled by the local agent, the message id remote field of the data segment's entry is set by the local agent to equal the id of that message, thus signifying the latest message of the remote agent that was seen by the local agent.

Detection of messaging deadlocks is done within the procedures that process messages from the remote agent (see FIG. 9). The agents use the message ids stored in the data segment's entry (see FIG. 2) and received with the message to determine whether or not the remote agent saw the latest message sent by the local agent before sending its message. Specifically if the local message id is different than the local message id sent with the message from the remote agent, meaning that the remote agent did not see the message sent by the local agent before sending its message, then a deadlock is identified.

When a deadlock is identified, one of the agents, determined dynamically or statically (depending on the type of deadlock as described next), avoids waiting for the remote agent's response, thus resolving the deadlock. In a no owner messaging deadlock the resolving agent is predefined statically. In a permission/invalidation messaging deadlock the resolving agent is the one processing the invalidation request message (namely, the agent that sent the permission request message, and is the non-owning agent).

Figure 10:
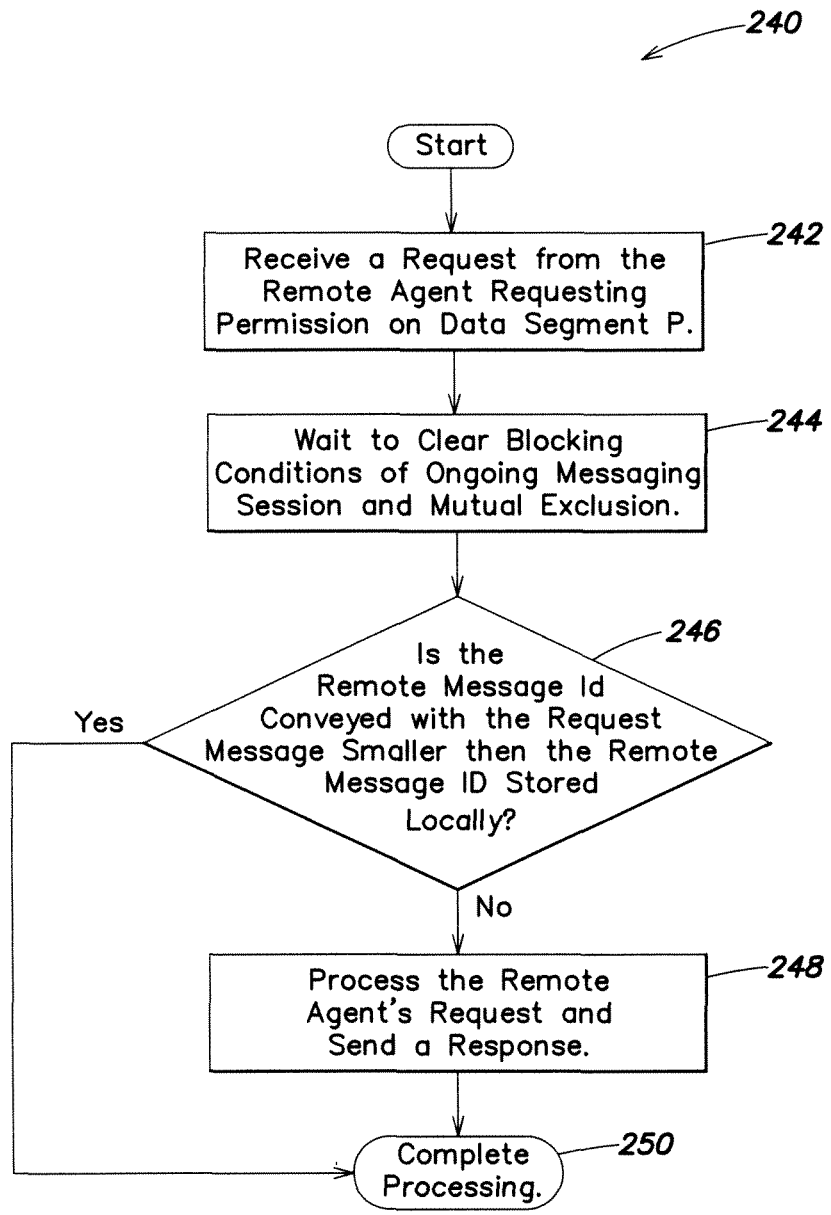
FIG. 10 is a flow diagram of a procedure for pruning obsolete messages, according to one embodiment.

An additional use of the message id mechanism is for pruning obsolete messages (illustrated by the procedure 240 shown in FIG. 10). Since messages arrive and are transferred for processing in an arbitrary order relative to their generation and sending, an agent may receive obsolete messages which should not be processed. If such a message is processed ownership may be lost, if the remote user that generated this message has already timed out. Therefore, upon reception of a message (step 242), and after waiting to clear any blocking conditions of an ongoing messaging session or mutual exclusion (step 244), the receiving agent determines (step 246) that the message is obsolete if the remote message id conveyed with the message is of a smaller order than the remote message id stored in the data segment's entry. If the message is determined to be obsolete, it is discarded and processing completes (step 250). Otherwise, the receiving agent processes the remote agent's request and sends (step 248) a response, which completes the process (step 250).

Message ids should be locally unique in order to support the no owner messaging deadlock, and should further enable ordering of the messages relative to their order of generation in order to support pruning of obsolete messages. These message ids should be allocated with sufficient size, so that a complete cycle of these ids including wrap-around is practically impossible with regard to the frequency of messaging sessions. Avoiding wrap-around should also be considered when calculating the difference between the values of message ids.

A-8. Recovering the Latest Data Segment Contents

Figure 11:
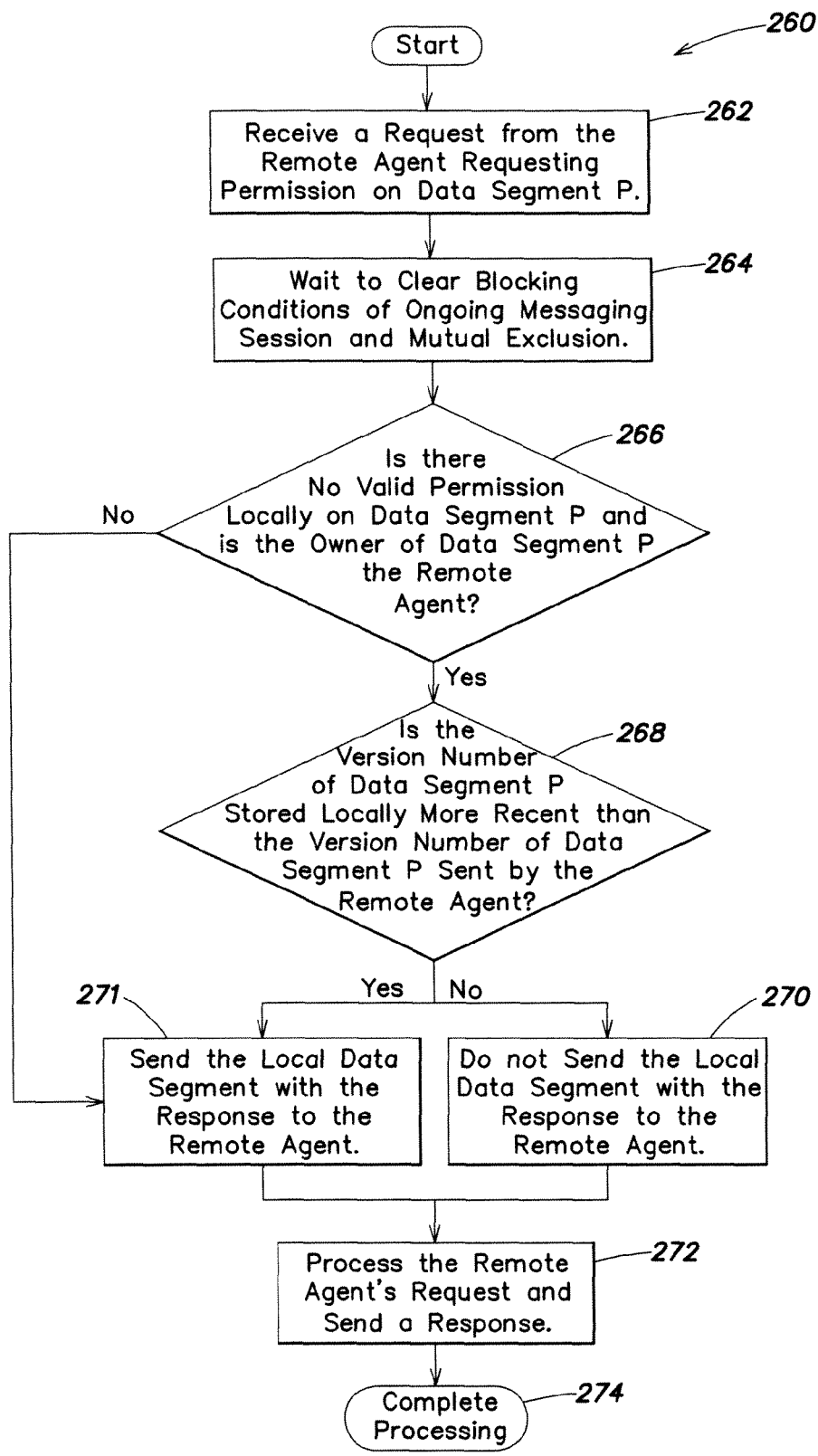
FIG. 11 is a flow diagram of a procedure for recovering the latest contents of a data segment, according to one embodiment.

When the ownership of a data segment is lost, the knowledge on the whereabouts of the latest contents of the data segment, normally stored with the owner, is also lost. Therefore, as part of the ownership recovery algorithm, specified in the previous sections, the latest contents of the data segment should be also identified and restored. A procedure for this purpose is illustrated in FIG. 11.

The computation for determining the location of the latest contents of a data segment with no owner is done within the procedure that processes a permission request message from the remote agent (e.g., the steps 262 and 264 of receiving a permission request from a remote agent and waiting to clear any blocking conditions of an ongoing messaging session or mutual exclusion). As further illustrated in FIG. 11, if the local agent determines (step 266) that it has a valid permission on the data segment, then the data segment's contents available to the local agent is latest, thus deterministically identified, and this contents can be sent (step 271) to the remote agent with the response (step 272) giving ownership, thus restoring the latest data segment's contents, and completing the process (step 274). Otherwise, step 266 determines there is no valid permission locally, and the latest contents of the data segment may be at either side. In this case data segment version numbers, maintained by each agent for each data segment, and conveyed with messages, are compared (step 268). The responding agent compares the data segment version number conveyed with the message to its own data segment version number, and determines that the data segment contents available locally is latest if the local version number is more recent than the version number sent by the remote agent. Only in this case the responding agent sends (step 271) its data segment contents to the remote agent; otherwise the responding agent does not send (step 270) its data segment contents.

Preferably, so that a data segment entry is highly compact, the data segment version number field is allocated with a minimal number of bits. Small version number fields (e.g. 2 bits) with fast wrap-around require a special method for maintaining them, specified herewith. Data segment version numbers are maintained so that when both agents have the same data segment contents their associated version numbers shall be identical; and when an agent updates a data segment, its version number shall be different (e.g. larger by one) than the version number stored by the remote agent. One embodiment of a method for setting the values of a data segment version number is described as follows.

When an agent upgrades its permission on a data segment from shared to exclusive, the data segment version number stored with that agent is set to equal a value larger by one relative to the version number stored with the remote agent. When an agent upgrades its permission on a data segment to shared permission, the data segment version number stored with that agent is set to equal the version number sent by the remote agent. The specifics of this method are further elaborated below.

In the case where the ownership is local and there is no permission on the data segment, regardless of the requested permission, the data segment version number is incremented by one relative to the stored version number.

In the case where the request is for shared permission: If ownership is remote and the data segment contents has been conveyed with the response message (meaning that the remote agent's contents is latest) and the remote agent keeps its shared permission, then the data segment version number is set to the remote agent's data segment version number conveyed within the message. Otherwise, if the remote agent does not keep a valid permission, then the data segment version number is incremented by one compared to the remote agent's version number.

In the case where the request is for exclusive permission: If the ownership is local and the current permission is shared and the remote agent has a copy of the data segment, then an invalidation request is sent to the remote agent and responded, to subsequently setting the data segment version number to a value larger by one than the version number conveyed with the remote agent's response. If the remote agent does not have copies (i.e. no invalidation request is sent), then the data segment version number is not modified, since there is already a difference of one between the local and the remote version numbers. Further elaborating, there are no copies due to either a previous exclusive permission request or invalidation request sent from the remote agent, or a previous shared permission request of a local user upgrading from no permission (where ownership is local)—in all cases the version number was already incremented. If ownership is remote and a permission request message is sent to the remote agent, then regardless if the data segment contents is sent with the response from the remote agent, the data segment version number is set to a value larger by one than the version number conveyed with the remote agent's message (thus creating a difference of one), since an exclusive permission is granted.

A-9. Modifying the Data Segment Entry after Sending a Response Message

Consider a procedure (e.g. FIG. 7) that processes a permission request message sent from the remote agent. After this procedure sends a response message to the remote agent, it must modify the data segment's entry to its new state, regardless of the unknown fate of the message. However, since this procedure features the method for resolving the no owner messaging deadlock (FIG. 9), operating concurrently with other operations, caution is exercised with regard to updating the data segment's entry, and it is modified in the following two cases.

Figure 12:
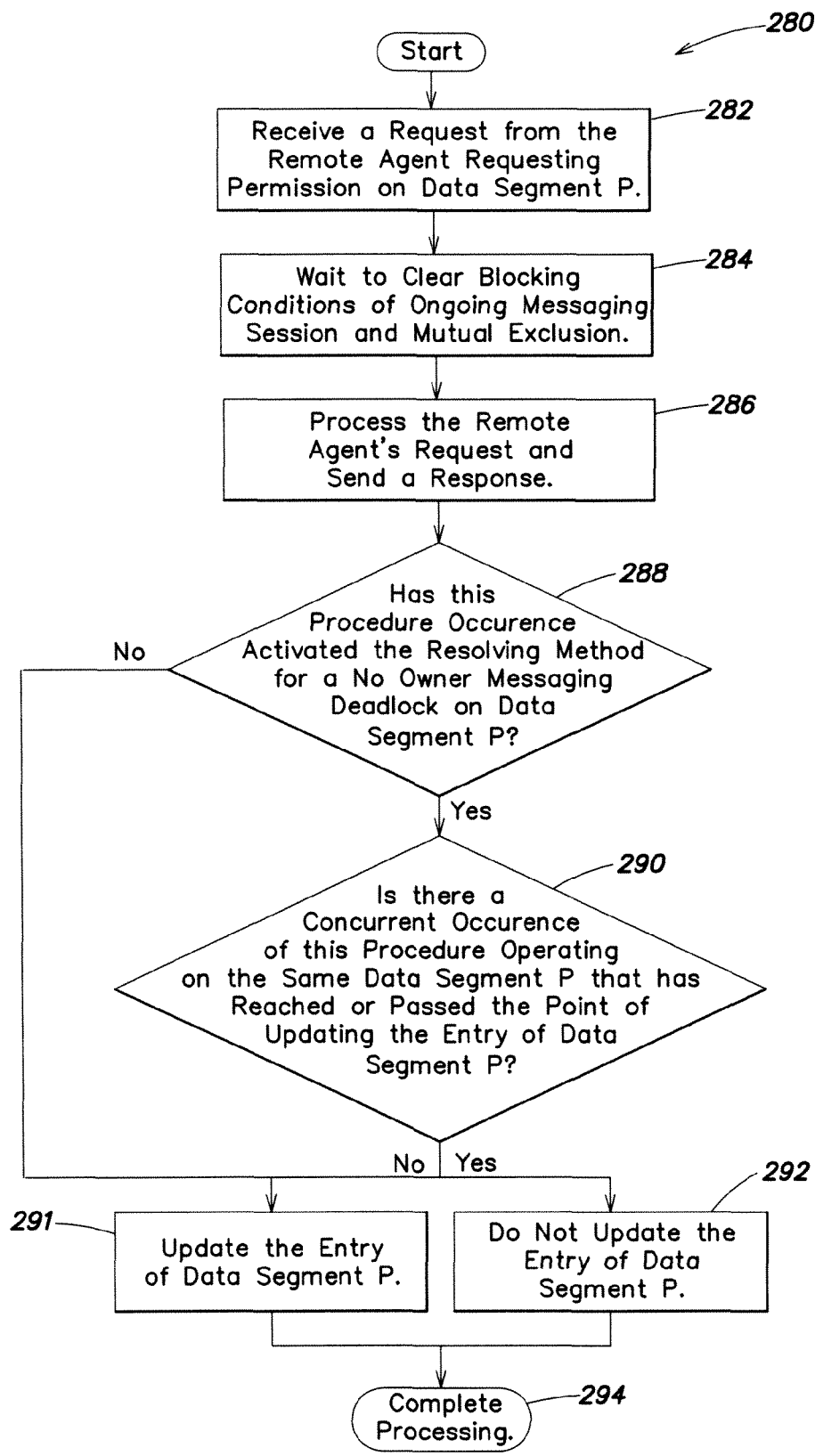
FIG. 12 is a flow diagram of a procedure for modifying the entry of a data segment after sending a response message, according to one embodiment.

As illustrated in FIG. 12, in a procedure for handling a permission request from a remote agent (steps 282-286), if it is determined (step 288) that this procedure does not activate the deadlock resolving method, then the entry is updated (step 291) and the process terminates (step 294). If it is determined (step 288) that this procedure activates the deadlock resolving method and it is determined (step 290) that a concurrent procedure operating on the same data segment has not yet reached the point of updating the data segment's entry, then the entry is updated (step 291), otherwise the deadlock resolving procedure does not update (step 292) the data segment's entry. This way, a deadlock resolving procedure does not override modifications made by a procedure that does not activate this method. This avoidance is required, since either the deadlock was indeed resolved by the deadlock resolving procedure, or the response it sent was no longer awaited for—in both cases its subsequent update of the data segment's entry is no longer required.

A-10. Summary

There has been described one embodiment of a DSM algorithm and technology in a two (2) node cluster that uniquely supports unreliable underlying message passing technologies. The DSM algorithm assumes complete uncertainty on whether a message that is sent reaches its destination (possibly with delays) or not, and assumes there is no feedback on the fate of each message. It further assumes no ordering on the reception of messages relative to their order of generation and sending. Given these assumptions, the present DSM algorithm efficiently maintains full consistency of both user and internal data.

B-1. Introduction to Distributed Shared Caching for Clustered File Systems (CFS)

File systems improve the efficiency of storage accesses by using caching methods to reduce disk accesses. In clustered (a.k.a. shared disk) file systems, which provide concurrent read and write access from multiple clustered computers to files stored in shared external storage devices, caches are maintained within each computer. In such an architecture cache coherency, namely the integrity of data stored in the distributed caches, is a major consideration. Generally, all users accessing the file system should be provided with a consistent and serialized view of the files, avoiding corruption of data. Specifically, a read made by a user U1 to block B that follows a write by a user U2 (which may be the same or another user) to B must return the value written by U2, if no other writes to B were made between the two accesses. In addition, writes to the same block must be sequenced, namely all users view the values written to block B in the order that they were applied. Several approaches have been suggested for achieving cache coherency. A prominent and common approach is the write-invalidate method, where a write operation to a block B invalidates all the copies of that block in other caches.

In existing clustered file systems the resolution for cache coherency is generally a file. As long as a file is not modified, the contents of the file in all caches is consistent. When a user writes to a file, the contents associated with this file is invalidated in all other caches, in order to ensure a coherent view for other users. If such invalidation did not occur other users may receive obsolete contents of that file, thus defying cache coherency. When users read from a file, immediately after it was modified, the contents associated with this file in the cache of the user that performed the write operation is typically written to disk, thus maintaining coherency of the data being read. However, as write operations become more frequent, this cache coherence method becomes significantly inefficient, as the probability of cache hits is substantially reduced. For high performance distributed systems that employ intensive concurrent read/write access patterns to shared files, existing methods for cache coherency within clustered file systems result in poor performance.

In accordance with various embodiments of the present invention, a method is provided for efficient caching, guaranteeing cache coherency, for clustered file systems. In contrast to existing methods, the present caching method provides good performance in an environment of intensive access patterns to shared files. In the present method, cache coherency is achieved based on a resolution of fixed or variable sized and relatively small (e.g. a few kilo bytes) data segments, rather than files. In this way cache coherency is disassociated from the concepts of files. Coordination between the distributed caches (including invalidation of segments), their coherency and concurrency management, are all done based on the granularity of data segments rather than files. The present method utilizes the distributed shared memory (DSM) technology previously described, for cache management. DSM provides an abstraction that allows users to view a physically distributed memory of a distributed system as a virtual shared address space. Thus, with the present method, when a user writes to a file, only the affected data segments are invalidated in the other caches, thus tightly bounding the modified regions of data. Consequently, the proposed solution increases the probability of cache hits, and maintains high efficiency in situations of intensive access patterns to shared files.

B-2. Architecture of the CFS Caching Method

Figure 13:
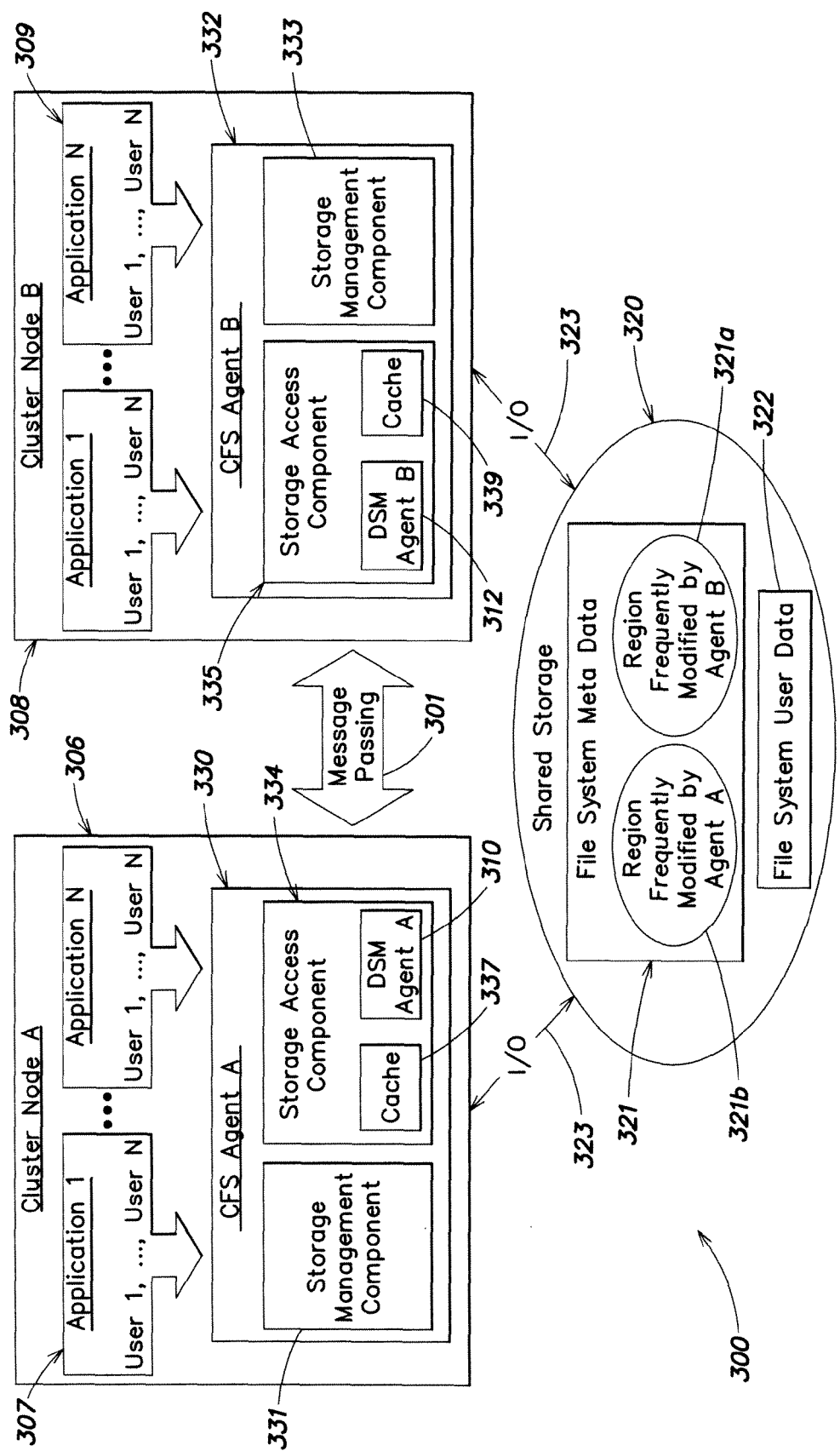
FIG. 13 shows schematically a system for implementing a distributed shared memory in a clustered file system (CFS) in accordance with one embodiment of the invention in which CFS agents A and B, each including a respective DSM agent A and B, reside on different clustered nodes A and B, and access a common shared storage.

In the disclosed embodiment, the new method is embedded within a two node 306, 308 clustered file system 300. FIG. 13 depicts the CFS architecture, wherein components corresponding to those in FIG. 1 (the DSM architecture) have been given similar reference numbers (in the 300 range). The DSM agents 310, 312 manage access permissions to the entire space of file system data in a shared storage 320, (e.g., shared disk storage) including file system metadata 321 and file system user data 322, via input/output requests 323. Each of nodes 306, 308 has an associated set of local users 307, 309, respectively.

The file system logic components 330, 332 (CFS Agents A and B on nodes A and B respectively) are partitioned into two high level components. The first component 331, 333 manages the storage and the association of storage segments to data segments and/or files. It uses file system metadata on the shared storage 320 to facilitate its operations, and allocates storage for user data as required. Distinctive from existing clustered file systems, where this component provides users only with the abstraction of files, in the present architecture this component provides also the abstraction of data segments, in addition to the abstraction of files. Such data segments may be provided either grouped by or independent of files. In the former case, files are regarded as sets of data segments. The second component 334, 335 manages access to shared storage 320, relying also on the storage management (first) component 331, 333. A main functionality of this second component is caching to reduce disk accesses. Caching may be applied to both file system metadata and user data. In this architecture, efficient and coherent caching is implemented via an integration of a cache component 337, 339 with a DSM component 310, 312 (respectively for each of nodes 306 and 308).

The CFS agents 330, 332 each manage a set of data segments in their local cache 337, 339 whose total size is typically significantly smaller than the capacity of available storage. A data segment in the cache may be associated with a data segment in the shared storage, or may be disassociated from any data segment (i.e. available). Data segments in use are locked in the cache, in the sense that these data segments cannot be disassociated from their disk data segments. When such data segments are not used any more, and other disk data segments are required for access, they can be disassociated from their disk data segments, using for example a Least Recently Used mechanism, for eviction from the cache.

The DSM components 310, 312 provide an abstraction that allows the physically distributed caches 337, 339 within the distributed CFS agents 330, 332 of the clustered file system to behave as a shared virtually global cache. The DSM components manage access permissions to the entire space of file system data in shared storage 320, while, in contrast to traditional DSM technologies, the DSM agents here do not have an internal set of memory data segments, rather they are integrated with their local cache components 337, 339 that enable to load only a small relevant subset of the file system data into cache. The DSM components 337, 339 also provide instructions to their associated storage access components 334, 336 on the required method for obtaining the latest contents of a data segment specified for retrieval, optionally retrieving the latest contents via messaging 301 with the remote DSM agent.

Elaboration on the basic operation of the DSM components has been presented in the prior sections of this application. Elaboration on the integrated operation of the DSM component and the cache component within the storage access component, is presented in the following section.

B-3. Using DSM for Caching within a Clustered File System

In the context of understanding the following detailed embodiment, the following definitions may be useful (in addition to the definitions previously provided in a discussion of the DSM):

Shared storage. Storage devices that are accessible by multiple computers.

Clustered file system. A file system that provides concurrent read and write access from multiple clustered computers to files stored in shared external storage devices.

Cache coherency. The integrity of data stored in the distributed cache memories comprising a virtual shared cache. Generally, all users accessing the virtual shared cache, performing both read and write operations, must be provided with a coherent and serialized view of the data stored in the virtual shared cache.

User of a clustered file system. A procedure that uses CFS, and is executed by a specific thread of operation within a computer application.

The clustered file system provides a data segment based interface for accessing files and/or storage. A user may open and close files to notify on beginning and completion of access to specific files. A user may perform the following operations in accordance with one embodiment of the invention:

Allocate a data segment: The user is provided with the address of the newly allocated disk data segment, and a pointer to a cache data segment associated with this disk data segment. The permission on the allocated data segment is set to exclusive.

De-allocate a data segment: The user provides the address of a disk data segment for de-allocation, and the file system de-allocates that data segment.

Retrieve an already allocated data segment with a shared or exclusive permission: The user provides an address of an already allocated disk data segment; and the file system grants the required permission on that data segment, retrieves its latest contents, loads it into a cache data segment, and returns a pointer to this cache data segment.

Mark a retrieved data segment as modified: The user provides an address of a retrieved disk data segment, signifying that the contents of this data segment has been modified and should be written to disk. The data segment must have been retrieved with an exclusive permission.

Signify on completion of usage of a retrieved data segment: The user provides an address of a retrieved disk data segment, signifying on completion of its usage.

Write cache data segments that are marked as modified to the shared storage.

In the remainder of this section, methods of using the DSM and cache components within the procedures that implement the aforementioned functionalities are specified.

Figure 14:
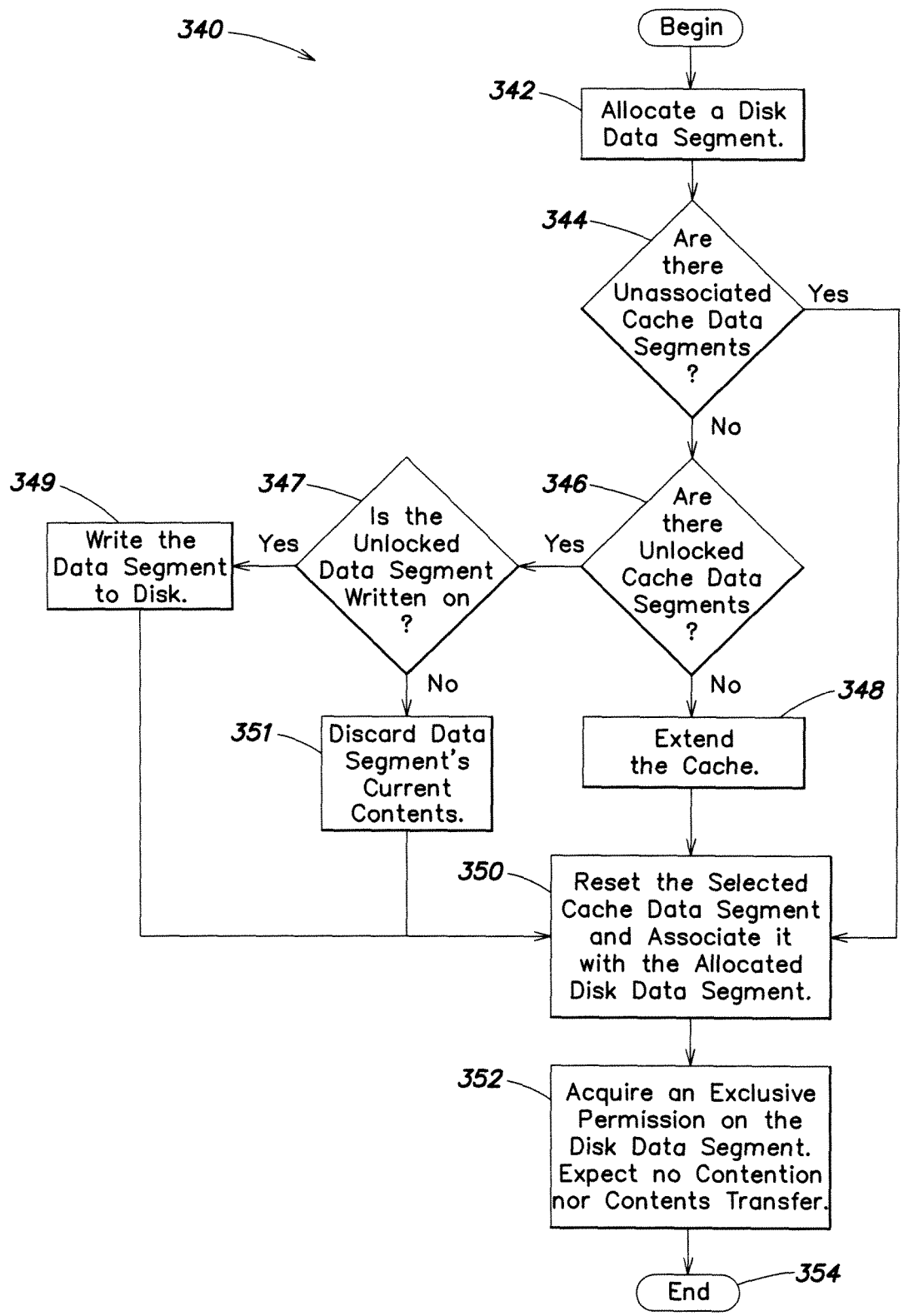
FIG. 14 is a flow diagram of a procedure for allocating a data segment, according to one embodiment of the invention.

A procedure 340 for allocating a data segment (FIG. 14) begins by allocating 342 a disk data segment via the storage management component. Then a cache data segment is associated with the newly allocated disk data segment and locked in cache memory (by incrementing its usage count) 350. Associating a cache data segment is done in the following way: If it is determined that 344 there are unassociated cache data segments, one of them is associated 350 with the new disk data segment. If there are no unassociated cache data segments, and it is determined 346 there is an unlocked data segment, then one of the associated and unlocked data segments is used. If such an associated and unlocked data segments is determined 347 to be marked as modified, then it is written 349 to the shared storage before usage. If not, the data segment's current contents is discarded 351. If all cache data segments are associated and locked, then the cache may be dynamically extended 348. Upon association, the associated cache data segment is cleared 350, and marked as modified. Following the allocation of a cache data segment, an exclusive permission is acquired 352 on that disk data segment using the DSM component, and the procedure ends 354. There will not be any contention on the data segment, and the data segment's contents will not be overwritten by the DSM component, since the data segment in the remote agent's cache is not valid.

Figure 15:
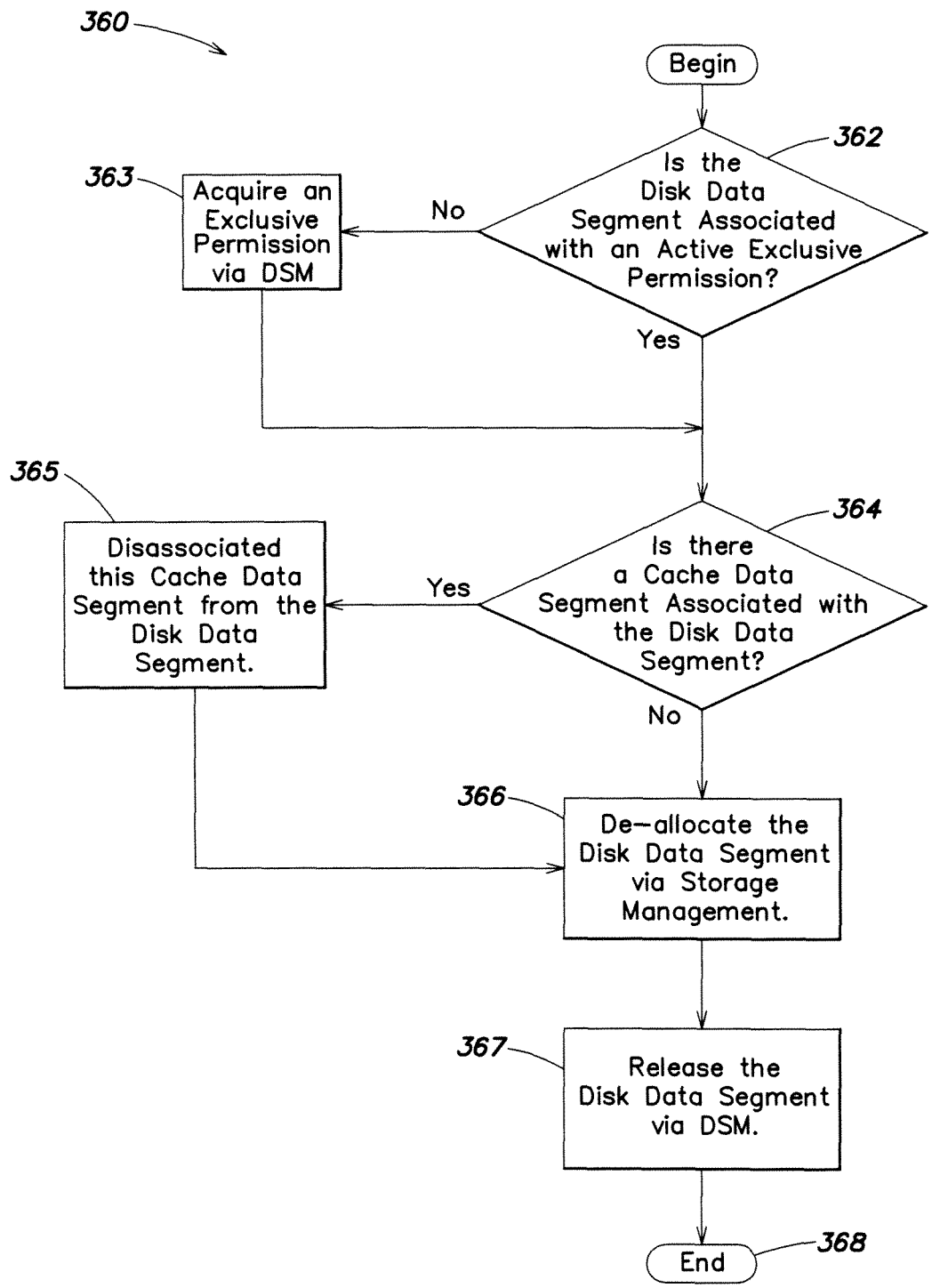
FIG. 15 is a flow diagram of a procedure for de-allocating a data segment, in accordance with one embodiment of the invention.

A procedure 360 for de-allocating a data segment (FIG. 15) begins by ensuring 362 that the disk data segment must not be in shared permission and in use. The disk data segment must be in an active exclusive permission before de-allocation. If this is not the case, an exclusive permission is acquired 363 by the procedure on the disk data segment. This invalidates a corresponding cache data segment in the remote agent's storage access component, so if the remote agent allocates this data segment, its contents in the local cache of that agent will not be considered as valid. There must not be any contention on the data segment. Then, if it is determined that 364 there is a cache data segment associated with that disk data segment, it is disassociated 365. This is followed by de-allocation 366 of the disk data segment via the storage management component. Finally, the disk data segment is released 367 also via the DSM component, and the process ends 368.

Figure 16A:
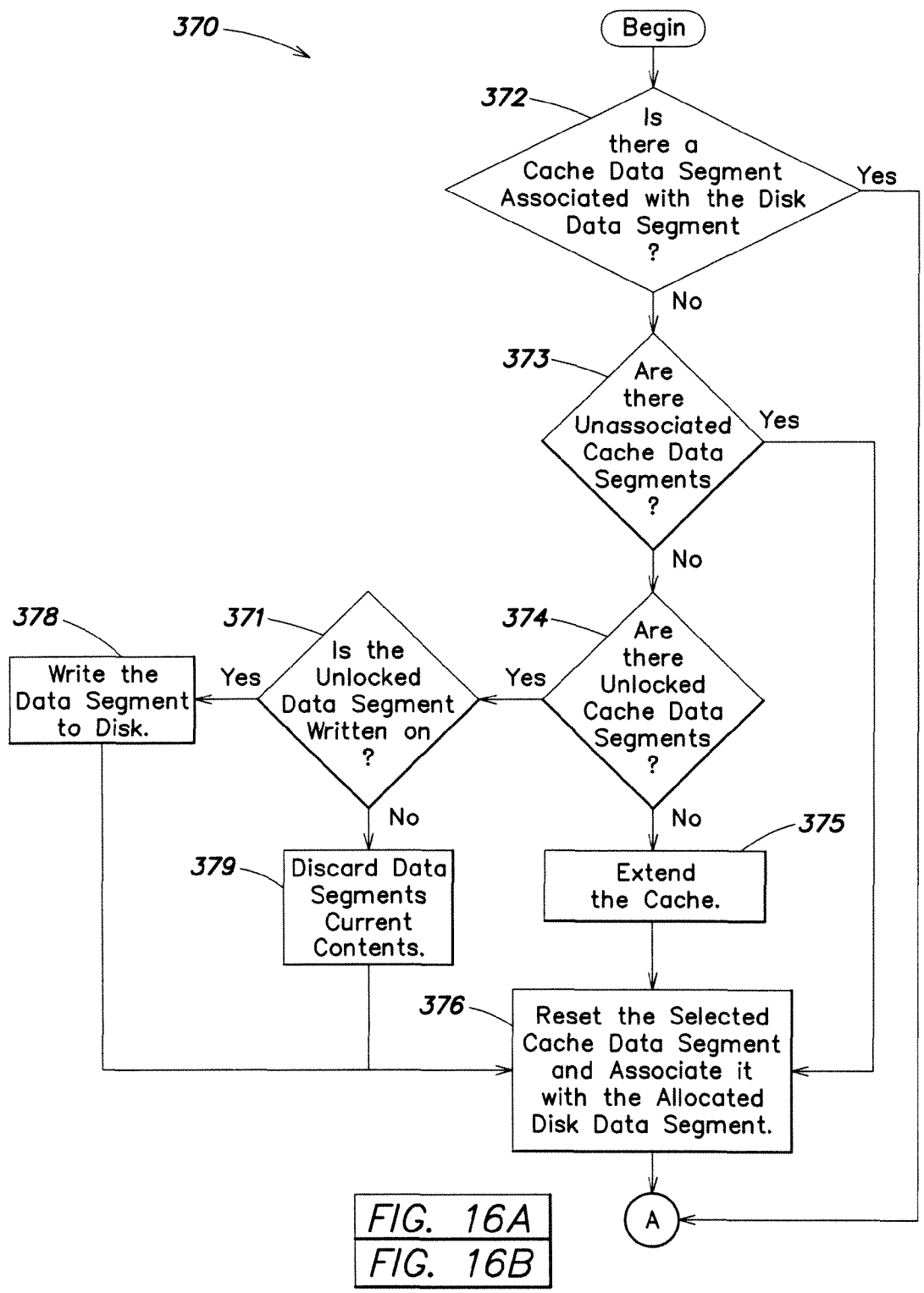
FIG. 16A is a flow diagram of a procedure for retrieving a data segment for usage, in accordance with one embodiment of the invention.
Figure 16B:
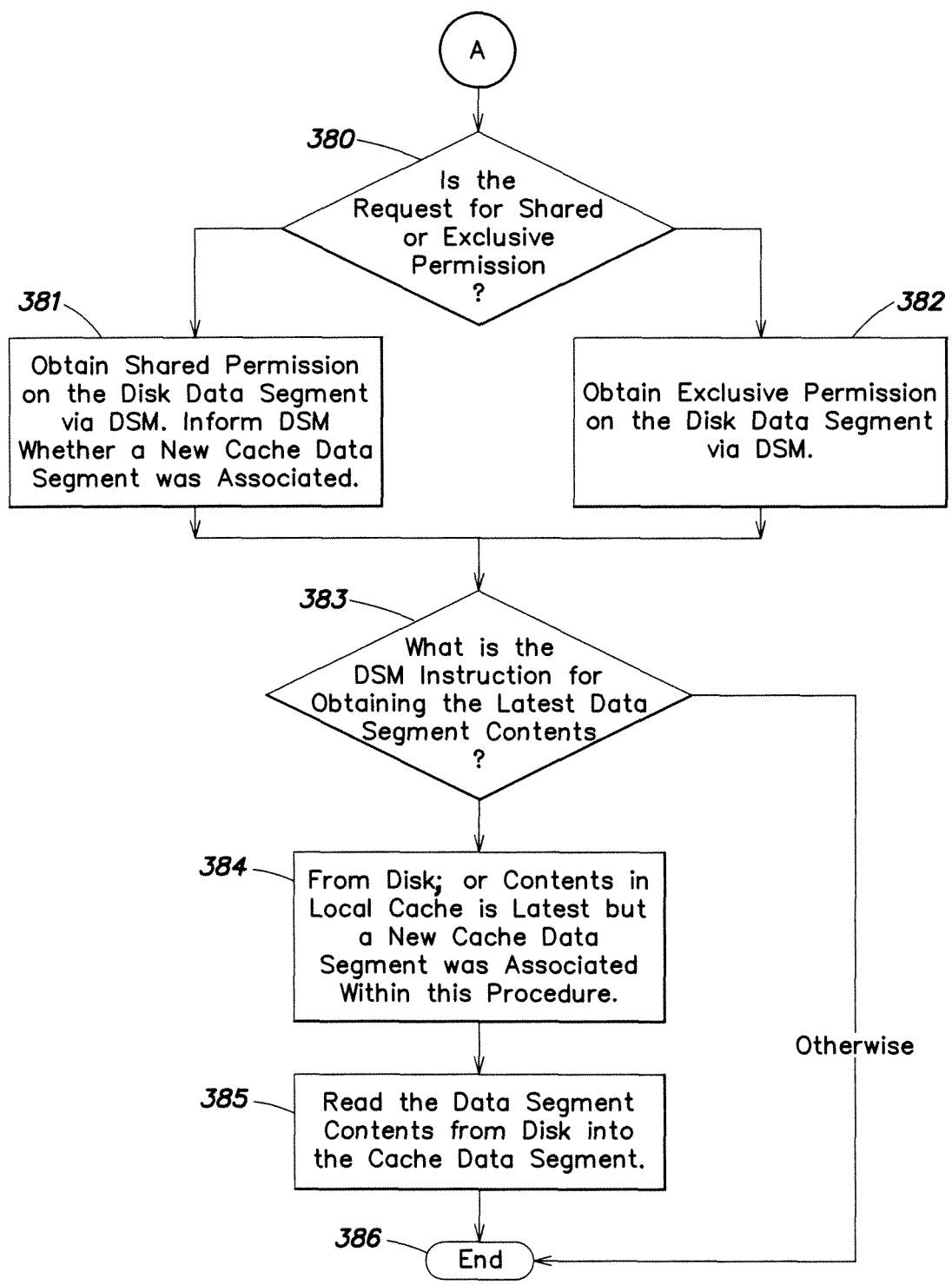
FIG. 16B is a continuation of FIG. 16A of a flow diagram of a procedure for retrieving a data segment for usage, in accordance with one embodiment of the invention.

A procedure 370 for retrieving a disk data segment for usage (FIG. 16) begins by examining 372 the cache for the presence of that data segment. If it is determined that 374 this data segment is not associated with any cache data segment, a cache data segment is associated 376 using the method described within the data segment allocation procedure 371, 378-379. Then permission is acquired on the disk data segment via DSM according to the user's request 380—shared 381 or exclusive 382. In this context, there is a special case, where a new cache data segment was allocated, and the request is for shared permission, and there is a valid shared permission on that data segment, and ownership of that data segment is remote, although normally no message should be sent to the remote agent to acquire permission, in this case a message is sent to the remote agent to retrieve the latest data segment contents. Upon acquiring permission, an instruction 383 is given by the DSM component on how to obtain the latest contents of that data segment. There are three possibilities in this context. The first is that the contents of that data segment in the local cache, if it exists, is latest. The second is that the latest contents of that data segment is provided by the DSM component via communication with the remote DSM agent. The third is that the latest data segment contents should be read from disk. Therefore, the data segment contents should be read from disk 385, in the context of the current procedure, in the following cases: The DSM component instructs to read the latest data segment contents from disk; or the DSM component instructs that the data segment contents in the local cache (if it exists) is latest but a new cache data segment was associated with the disk data segment within this procedure 384. In any other case, the disk data segment is not read from disk, and the process ends 386.

A procedure for marking a retrieved data segment as modified begins by ensuring that there is an active exclusive permission on that data segment and that there is a cache data segment associated with that disk data segment. If so, this cache data segment is marked as modified, so it can be flushed to disk within the next flush operation.

Flushing modified data segments to disk may be done by periodic flush operations, triggered by the user or the file system. The file system may decide to flush a set of data segments, when some conditions apply, for example, when the number of cache data segments marked as modified exceeds some threshold, or when the number of unassociated data segments in the cache is not sufficient. The flushing mechanism may be augmented with transactional or journaling support, entailing first flushing the modified cache data segments or a respective representation of their modifications to a log or a journal and then flushing these data segments to their final location in the shared storage. This enables improving robustness to failures by preventing data consistency problems. The cost entailed is additional write operations involved in flush operations. In addition, upon eviction of modified and unlocked data segments from cache, such data segments are flushed to the shared storage.

Figure 17:
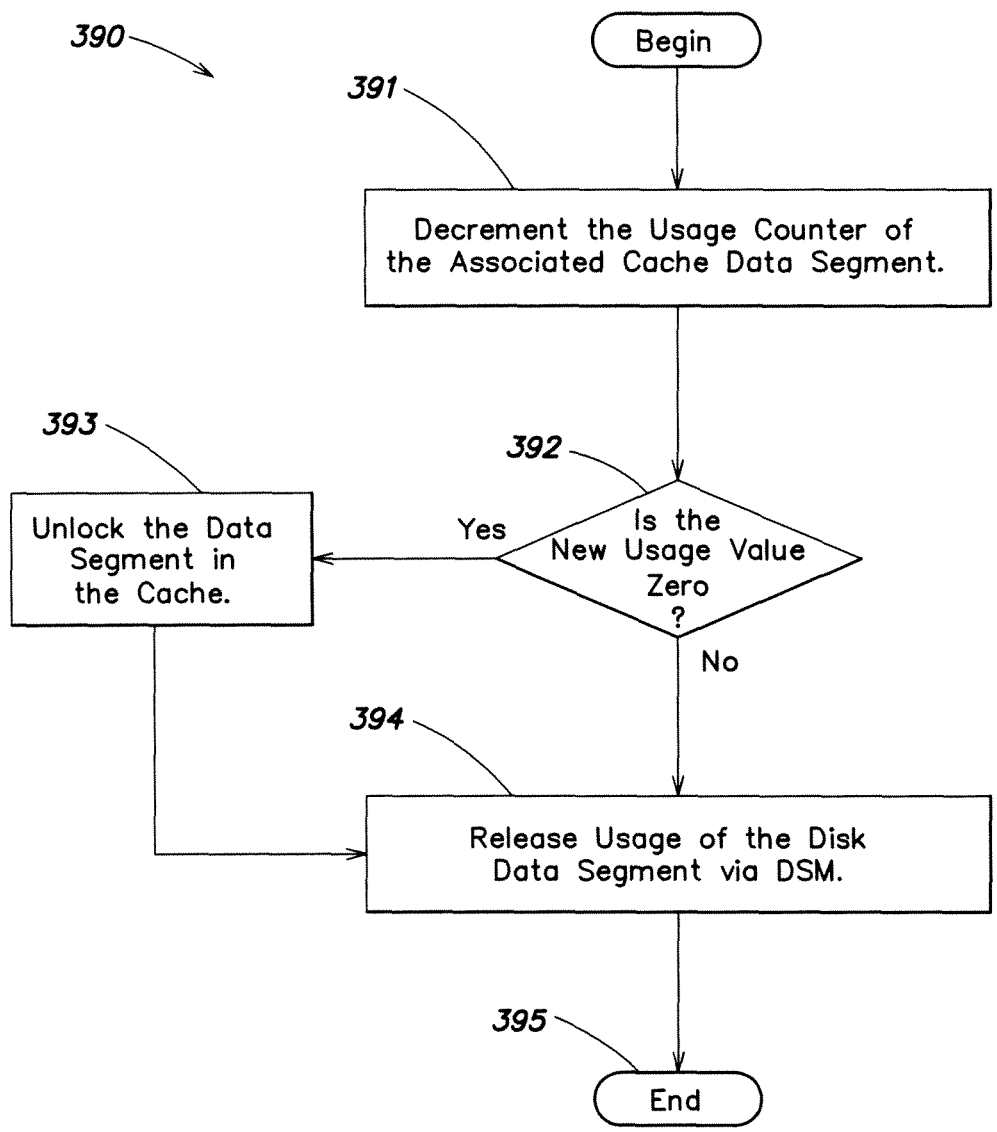
FIG. 17 is a flow diagram of a procedure for releasing usage of a retrieved data segment, in accordance with one embodiment of the invention.

A procedure 390 for releasing usage of a retrieved data segment (FIG. 17) begins with decrementing 391 the usage counter of the associated cache data segment. If it is determined 392 that the new usage value is zero, then the cache data segment is unlocked 393 (i.e. it may be evacuated from the cache). Then the disk data segment is released 394 via the DSM component, and the process ends 395.

When a DSM agent processes a request from the remote DSM agent, it may be required to convey the latest contents of a data segment, if present in the local cache, to the remote agent. To facilitate this the DSM procedure that processes request messages from the remote agent uses an interface provided by the local cache component. Such a DSM procedure determines with the local cache whether the requested disk data segment is associated with a cache data segment or not. If the data segment is associated with a cache data segment and the DSM agent has a valid permission on that data segment, then the DSM agent retrieves it from the cache (also locking it in the cache), sends it with the response, and then signifies the cache on completion of usage of that data segment. Otherwise, the DSM agent does not send that data segment with the response, signifying the remote storage access component to read that data segment from disk, and also transfers ownership of that data segment to the remote DSM agent. In addition, if ownership of a requested data segment is transferred to the remote DSM agent in this context, and that data segment is in the local cache and marked as modified, then it is flushed to disk, also clearing its modification mark.

Figure 18A:
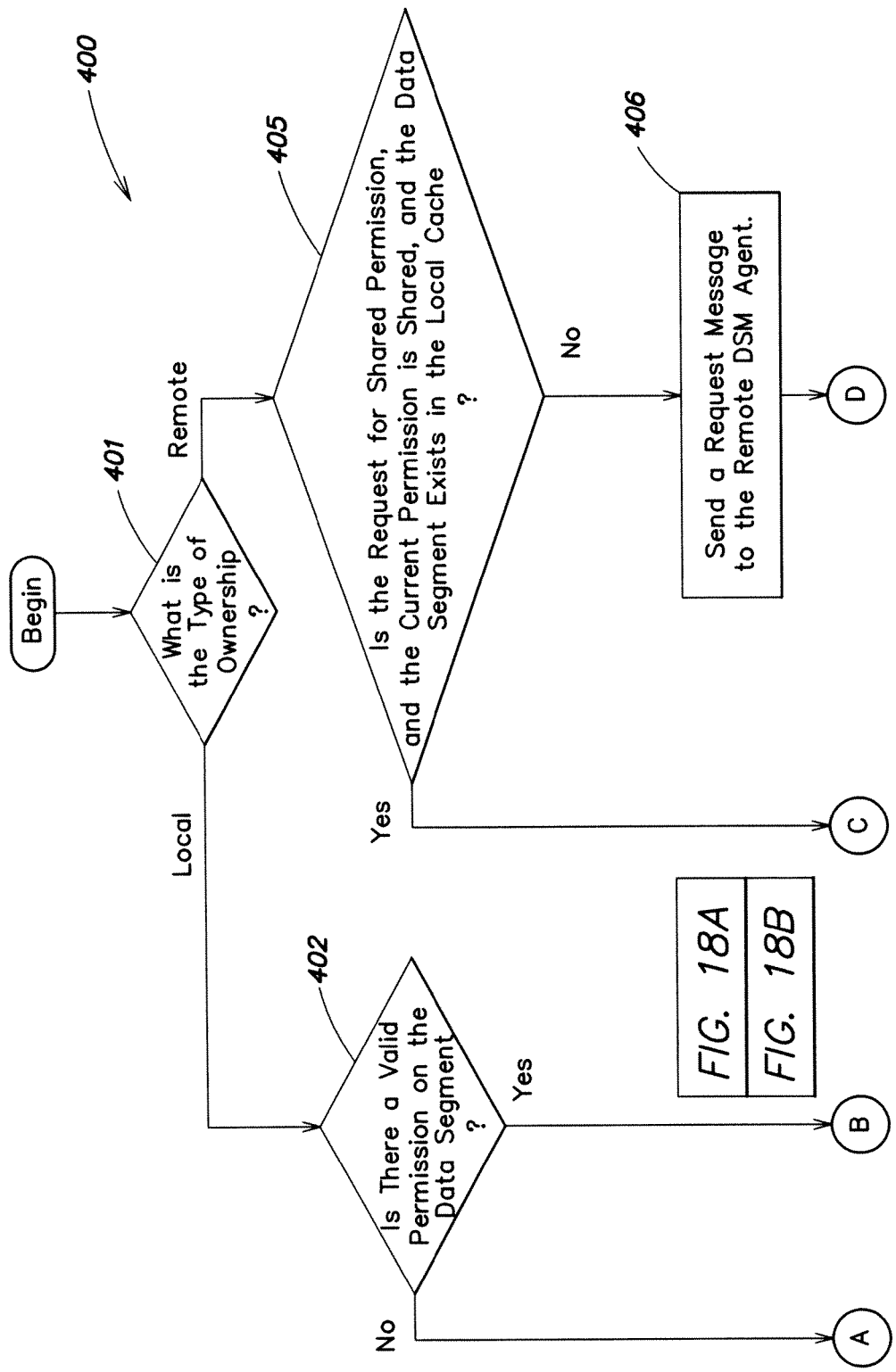
FIG. 18A is a flow diagram of a procedure for determining the latest contents of the data segment.

The DSM component, beyond granting the required permissions on disk data segments, also instructs the storage access component on the appropriate method to obtain the latest contents of a data segment being accessed. As previously mentioned, there are three possibilities in this context. The first is that the contents of the data segment in the local cache, if it exists, is latest. The second is that the latest contents of the data segment is provided by the DSM component via communication with the remote DSM agent. The third is that the latest data segment contents should be read from disk. To determine the appropriate method for obtaining the latest contents of a data segment, a procedure 400 (FIG. 18) determines whether the following conditions are true:

- If ownership of the data segment is determined 401 to be local and it is determined that 402 there is no valid permission on the data segment, then the data segment should be read from the disk 403, and the process ends 409. If, on the other hand, there is a valid permission on the data segment (shared or exclusive), then the data segment's contents in the local cache, if it exists, is latest 404.
- If ownership of the data segment is determined 401 to be remote, then the following conditions apply. If the request is determined 405 to be for shared permission and the current permission on the data segment is shared and the data segment exists in the local cache, then the data segment's contents in the local cache is latest 404. In any other case, a request message is sent 406 to the owner of the data segment (i.e. the remote DSM agent), and the data segment's latest contents is either transported within the response if it is determined 407 to be in the remote cache and with a valid permission, otherwise the data segment's latest contents should be read from disk 403.

To increase efficiency of the file system operations, caching integrated with DSM may be used for both user data and file system metadata. Therefore, the aforementioned procedures may be employed for efficient disk access also by the internal procedures of the file system components. To further improve efficiency, the file system metadata may be partitioned into regions (see regions 321*a* and 321*b* in FIG. 13), which are assigned to each of the clustered file system agents, such that each region is modified by a single file system agent more frequently relative to other file system agents. Such a partition alleviates contention on frequently accessed data segments and reduces messaging traffic for coordination of access.

B-4. Summary of CFS Caching Method

There has been described an efficient method embodiment for caching, guaranteeing cache coherency, for clustered file systems. In contrast to existing methods, the present caching method provides good performance in an environment of intensive access patterns to shared files. The method achieves cache coherency based on a resolution of fixed or variable sized and relatively small data segments, rather than files. In this way cache coherency is disassociated from the concept of files. Coordination between the distributed caches (including invalidation of segments), their coherency and concurrency management, are all done based on the granularity of data segments rather than files. The clustered file system utilizes the distributed shared memory technology previously described, for cache management. With the present method, when a user writes to a file, only the affected data segments are invalidated in the other caches, thus tightly bounding the modified regions. Consequently, the present embodiment increases the probability of cache hits, and maintains high efficiency in situations of intensive access patterns to shared files.

C-1. Introduction to Transactional Processing for Clustered File Systems

In accordance with various embodiments of the present invention, a method is provided for efficient transactional processing, consistency and recovery within clustered file systems. The new method enables users to operate on files using a resolution of fixed or variable sized and relatively small (e.g. a few kilo bytes) data segments. Users are provided with an interface for utilizing the transactional mechanism, namely services for opening, committing and rolling-back transactions. The operations joined into user defined transactions are operations on data segments within the file system. The new method utilizes the distributed shared memory (a.k.a. DSM) technology previously described, that facilitates efficient and coherent cache management (also previously described) within a clustered file system (CFS). DSM provides an abstraction that allows users to view a physically distributed memory of a distributed system as a virtual shared address space. DSM within a clustered file system enables the CFS to manage and coordinate cache coherency and concurrency based on the granularity of data segments (rather than files). In this way, when a user writes to a file, only the affected data segments are invalidated in the local caches of other computers (nodes), consequently, increasing cache hits and improving performance.

In the various embodiments described below and in the accompanying figures, a method for supporting transactional processing is provided which uses local journals, one for each computer (node) in the cluster, to record the user defined transactions. Transactions record all metadata and user data segments affected by the operations they include. The method includes procedures to write data segments into the journals and then to their final locations, so that concurrency is maintained. The method also includes procedures for rolling-back transactions, and recovering from system faults, both on-line (i.e. where there are operational computers in the cluster during the failure), and off-line (i.e. where there are no operational computers in the cluster during the failure). All these procedures are designed for maximal concurrency and minimal disruption to concurrent work in the cluster, in a manner distinctive from existing file systems.

C-2. Architecture of the Transactional Processing Method for CFS

Figure 19:
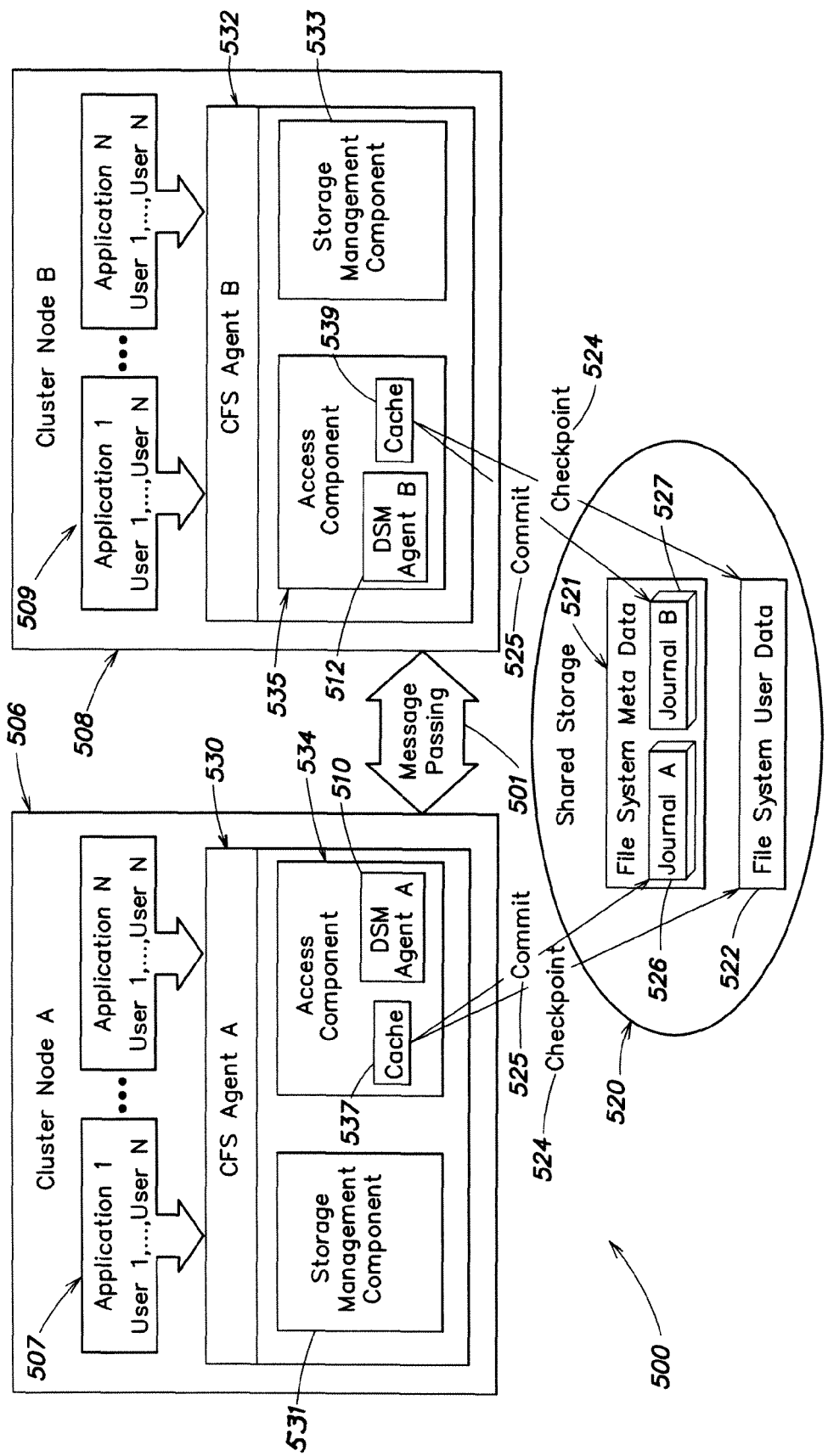
FIG. 19 shows schematically a system for implementing transactional processing for a clustered file system in accordance with one embodiment of the invention in which clustered nodes A and B each include a CFS agent A and B (respectively) and access a common shared storage.

In a disclosed embodiment, the new method is embedded within a two node 506, 508 clustered file system 500. FIG. 19 depicts the CFS architecture for transactional processing, wherein components corresponding to those in FIG. 13 (the combined DSM and CFS architecture) have been given similar reference numbers (in the 500 range). The DSM agents 510, 512 manage access permissions to the entire space of file system data in shared storage 520, including file system metadata 521 and file system user data 522. Each of nodes 506, 508 has an associated set of local users 507, 509, respectively.

The file system logic components 530, 532 (CFS Agents A and B on nodes A and B respectively) are partitioned into two high level components. The first component 531, 533 manages the storage and the association of storage segments to data segments and/or files. It uses file system metadata on the shared storage 520 to facilitate its operations, and allocates storage for user data as required. Distinctive from existing clustered file systems, where this component provides users only with the abstraction of files, in the present architecture this component provides also the abstraction of data segments, in addition to the abstraction of files. Such data segments may be provided either grouped by or independent of files. In the former case, files are regarded as sets of data segments. The second component 534, 535 manages access to shared storage 520, relying also on the storage management (first) component 531, 533. The main functionalities of this second component are caching to reduce disk accesses, transactional processing, and concurrency management. These functionalities are applied to both file system metadata and user data, and are implemented via integration of a transaction processing component with a caching component 537, 539 and a DSM component 510, 512 (respectively, for each of nodes 506 and 508).

Elaboration on the basic operation of the DSM and CFS components and architecture have been presented in prior sections of this application and will not be repeated. Elaboration on the integrated operation of the transaction processing methods with the DSM and CFS caching components, is presented in the following sections.

C-3. Transactional Processing Method within a Clustered File System

In the context of understanding the following detailed embodiment, the following definitions may be useful (in addition to the definitions previously provided in discussions of the DSM and CFS):

Transaction. A transaction is a logical unit of work, that either takes effect in its entirety or takes no effect at all. A transaction is isolated from other transactions, namely not operation external to the transaction can view the data in an intermediate state. Furthermore, upon successful completion a transaction is durable and guaranteed to survive system failures.

Each computer (node) in the cluster is associated with a dedicated, possibly cyclic, transaction journal, which stores committed transactions generated by users on that computer. Write operations to the transaction journal may include several data segments at once, and their size is optimized to the underlying storage device.

Figure 20:
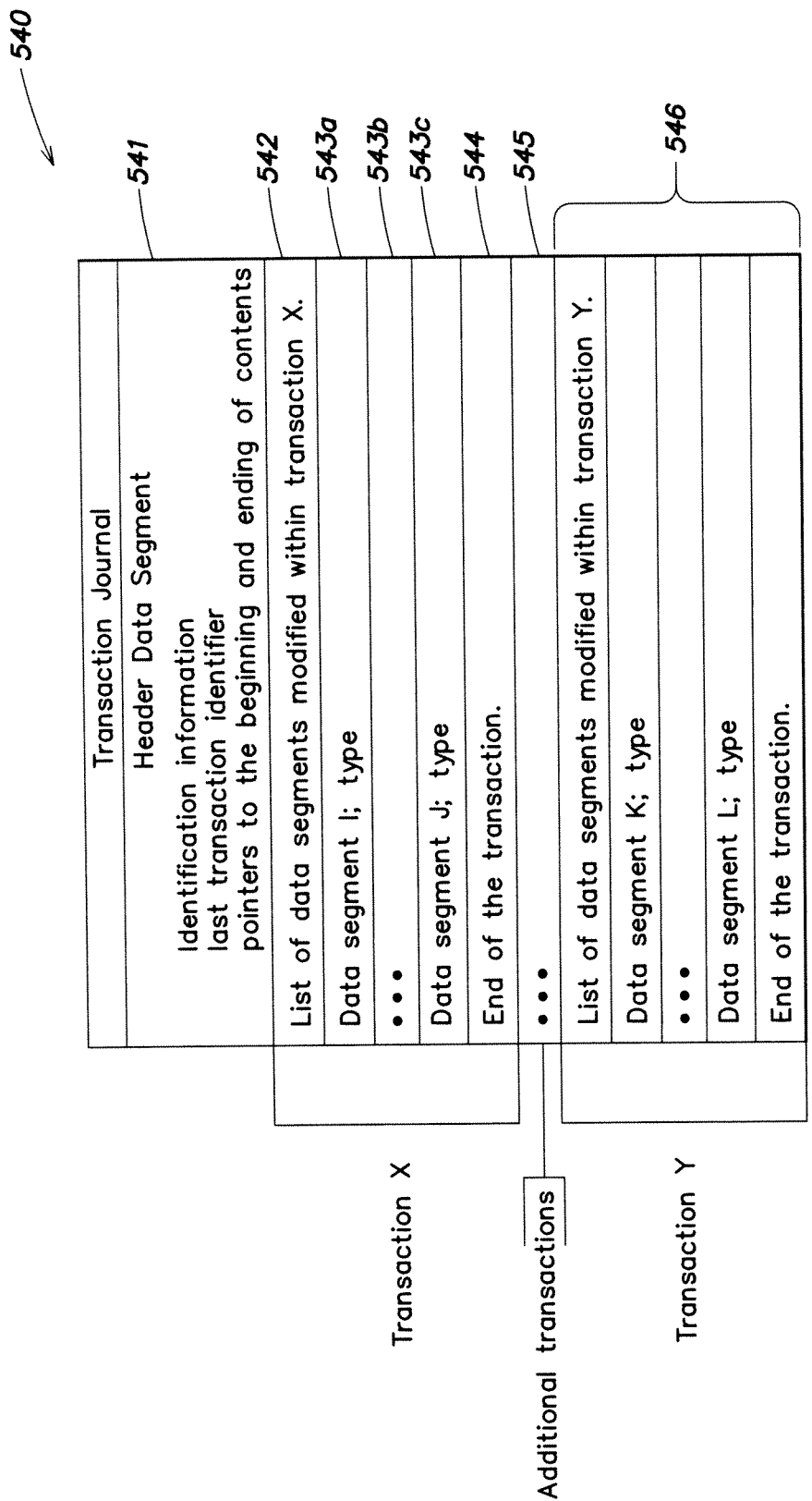
FIG. 20 is one embodiment of a data structure for a transaction journal.

FIG. 20 illustrates one example of a structure of a transaction journal 540. It begins with a header data segment 541 containing identification information, the identifier of the last transaction contained in the journal, and pointers to the beginning and ending of the transaction contents within the journal. The header data segment is followed by transaction data segments for an exemplary transaction X. Each transaction begins with a list 542 of data segment identifiers comprising the transaction, followed by the data segments 543*a*, 543*b*, 543*c*, ... themselves, and terminated with a data segment 544 indicating the end of the transaction record. Additional transactions 545 (abbreviated) and another transaction Y (546) are listed below transaction X in FIG. 20.

In the transaction processing method, user operations are applied to data segments in the cache; data segments are read to the cache, and optionally modified in the cache. A commit operation, signifying a successful termination of the transaction, writes the modified data segments (metadata and user data) to the transaction journal associated with the computer on which the transaction is processed. A checkpoint operation writes the modified data segments to their final location in the shared storage. A roll-back operation, signifying cancellation of the current transaction, reads data segments from the transaction journal associated with the computer on which the transaction is processed, to restore the cache to its state prior to that transaction. On-line and off-line recovery operations, where a computer recovers the file system due to failures of other computers in the cluster, either during normal work or before normal work starts (correspondingly), read data segments from the transaction journal of the failed computers, to subsequently write them to their final location in the shared storage.

In accordance with various embodiments of the present invention, transactions are initiated by multiple users and processes concurrently by the file system. Specifically, transactions that update disjoint portions of the file system are processed concurrently, while transactions that share updated portions are serialized. Users performing read only operations are allowed to access the file system concurrently, while users performing transactions are serialized with all and only the users that require access to the same file system portions affected by these transactions. To achieve serialization and isolation of transactions sharing the same updated portions of the file system, each transaction takes exclusive permissions on all data segments it modifies, and releases these permissions only upon termination of the transaction (via commit or roll-back). Transactions are globally ordered, across the cluster, according to their termination time.

To facilitate this, a transaction is allocated with an identifier at the time of its commit operation, atomically with the release of permissions on the data segments involved in the transaction. The identifier is implemented with a DSM component, to ensure a coherent view of this data across the cluster. Thus, transaction A precedes transaction B, according to their identifiers, if and only if A terminated before B. This global ordering method, coupled with release of permissions only upon transaction termination, ensures that if transactions A and B share a set of data segments S, and A's identifier is smaller than B's identifier, then the contents of the data segments of S associated with transaction B is more recent than the contents of the data segments of S associated with transaction A (since B blocked when trying to acquire permission on a data segment of S that A already acquired, and resumed only after A terminated). Within the metadata of each data segment, written in its final location in the shared storage and in the transaction journals, the identifier of the transaction that generated the contents of that data segment is also recorded. Thus, the transaction identifiers provide ordering on the recentness of the contents of data segments.

The basic operations of the CFS have previously been described, e.g., procedures for allocating a data segment (FIG. 14), de-allocating a data segment (FIG. 15), and retrieving a data segment for usage (FIG. 16), and marking a retrieved data segment. In the context of transactional processing, the following additional procedures will be described.

In the procedure for allocating a new data segment, after allocating a disk data segment and associating a cache data segment with the newly allocated disk data segment, also marking it as modified, that cache data segment and all other metadata data segments that were modified in the process of allocating the data segment are inserted into a list of data segments modified within the associated transaction.

In the procedure for de-allocating a data segment, after acquiring an exclusive permission on the de-allocated data segment and de-allocating the data segment, removing that data segment from the list of data segments modified within the associated transaction, if it exists there, and inserting all metadata data segments that were modified in the process of de-allocating the data segment into that list.

In the procedure for retrieving a disk data segment for usage, checking if there is an existing cache data segment associated with the requested disk data segment, and whether this cache data segment was dispatched to be written to its final location within an asynchronous checkpoint process which is still underway, and whether the user requires an exclusive permission on that data segment (i.e. the data segment may be modified). If these conditions hold then a shadow data segment is created in cache and provided to the user. A shadow data segment is identical in contents to the original data segment, and enables the user to modify the data segment, while its original replica is being written to its final location. Upon completion of the asynchronous checkpoint process, the original cache data segment is disassociated with the disk data segment, and the shadow data segment becomes the sole representation of the disk data segment in the cache.

In the procedure for marking a retrieved data segment as modified, after marking the associated cache data segment as modified, inserting that cache data segment into a list of data segments modified in the associated transaction, accompanied with an indication of whether this data segment was marked as modified before this operation (this is used in the procedure implementing roll-back).

The clustered file system also provides the users with an interface for operating the transactional processing mechanism:

Open a transaction: With this operation the user requests to begin a new transaction, and may do so upon completion of this operation.

Commit an ongoing transaction: With this operation the user requests a successful termination of an ongoing transaction. Upon completion of this operation it is guaranteed that the contents of that transaction is permanently applied to the file system, regardless of any fault that may occur after completion.

Roll-back of an ongoing transaction: With this operation the user requests cancellation of an ongoing transaction. Upon completion of this operation it is guaranteed that the file system is restored to its state before the beginning of that transaction.

In addition, the clustered file system implements the following procedures for operating the transactional processing mechanism:

Checkpoint: Writes data segments of committed transactions to their final location in the shared storage.

On-line and off-line recovery: Restore the consistency of the file system, after failure of a computer in the cluster, to its most recent consistent state, either on-line (i.e. during normal work) or off-line (i.e. without normal work), correspondingly.

In the rest of this section, the transactional processing method is specified in the context of each procedure implementing the above described operations.

A procedure for opening a transaction allocates a list structure that shall record the data segments involved in the transaction (e.g. FIG. 20).

Figure 21:
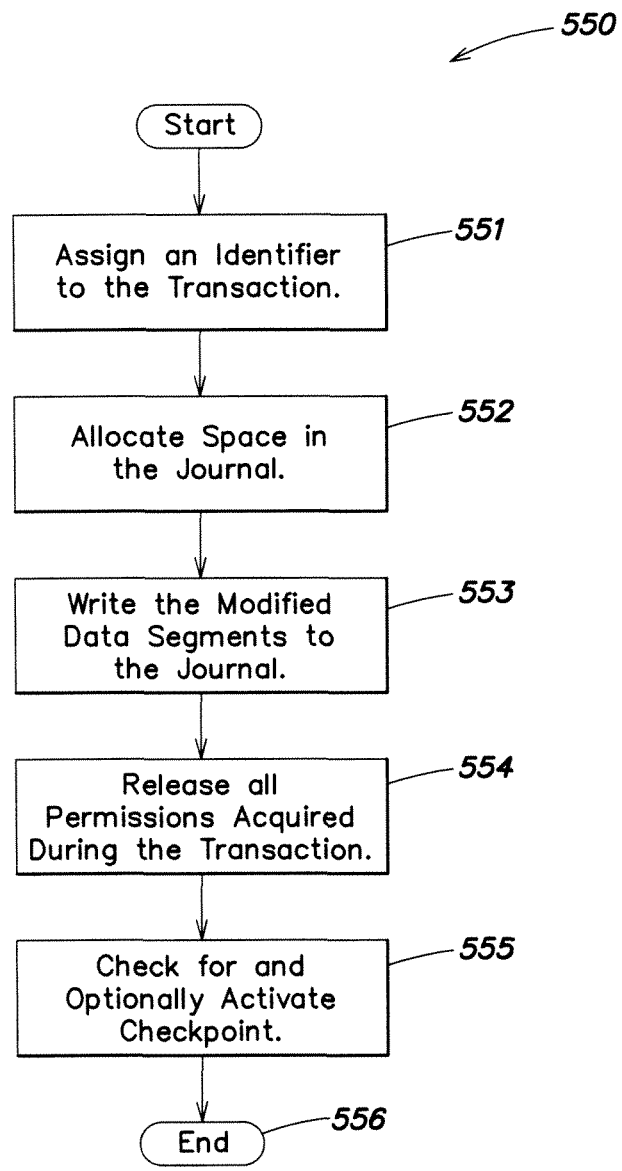
FIG. 21 is a flow diagram of a procedure for committing a transaction, according to one embodiment of the invention.

A procedure 550 for committing an ongoing transaction (FIG. 21) begins by assigning 551 a unique transaction identifier, larger than all previous identifiers (existing in the file system). It then allocates 552 the required space in the transaction journal associated with the computer on which the transaction is processed (the number of data segments that should be written to the journal is known based on a list of modified data segments). Then the data segments involved in the transaction are written 553 from the cache to the journal, using I/O operations which are optimized for the storage device holding the journal. This is followed by releasing 554 the exclusive permissions on the data segments involved in the transaction. Finally, the procedure checks 555 whether conditions that trigger a checkpoint are fulfilled. Examples of conditions for triggering a checkpoint are the relative portion of the journal that is occupied by transactions; the number of modified data segments; and the relative portion of the cache containing modified data segments. Checkpointing may be done in the background (a.k.a. asynchronous checkpoint), or in the foreground (a.k.a. synchronous checkpoint). Generally, when the conditions indicate that resources for recording further transactions are low, a synchronous checkpoint is executed; otherwise an asynchronous checkpoint is executed (if at all). If the said conditions are fulfilled then the appropriate checkpoint procedure (specified next) is executed, and the commit procedure terminates 556.

A procedure 570 for checkpointing (FIG. 22) writes data segments of committed transactions from the cache to their final location in the shared storage. Synchronous checkpoints have an additional responsibility, which is to ensure that resources for recording further transactions are sufficient. Such resources are mainly the space available in the journal and in the cache. Since a synchronous checkpoint is executed when these resources are low, such a checkpoint is synchronous in the sense that further transactions on the relevant computer are blocked until completion of the checkpoint. Adversely, asynchronous checkpoints allow further transactions during operation. Note that checkpoints are performed concurrently from the computers in the cluster, writing data segments to the shared storage. This is possible since each computer writes different data segments within the concurrent checkpoints to the shared storage (as elaborated later).

Figure 22:
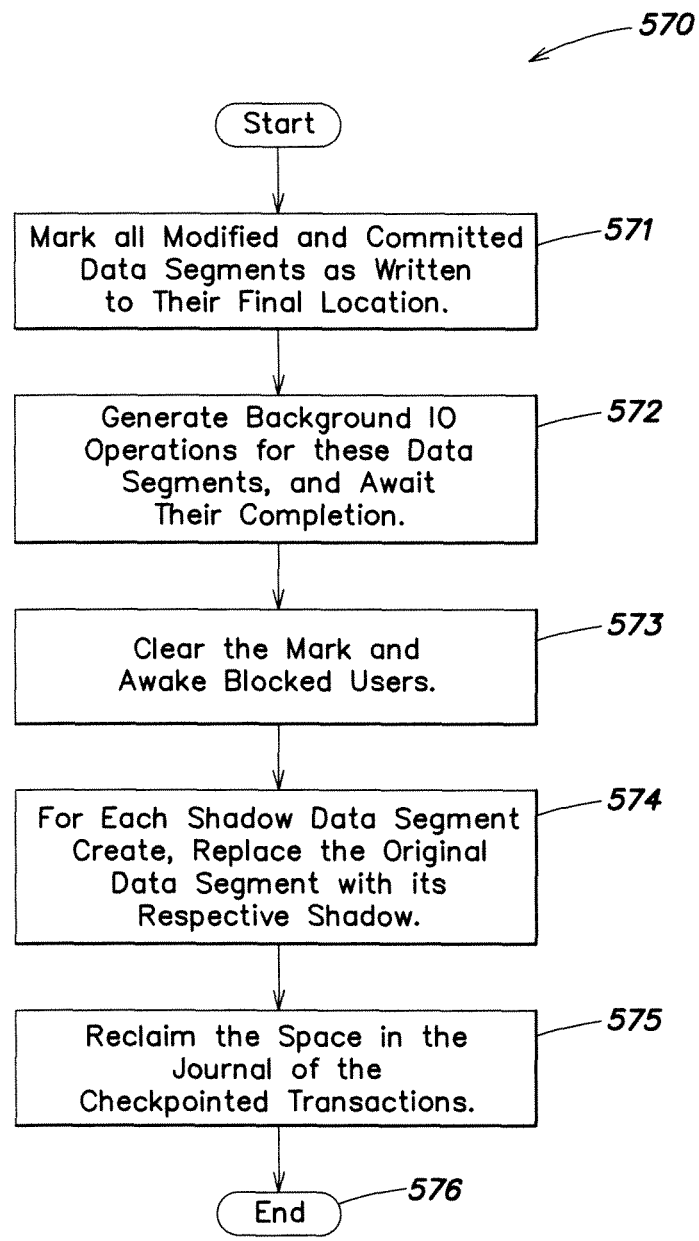
FIG. 22 is a procedure for checkpointing modified and committed data segments, in accordance with one embodiment of the invention.
Figure 23:
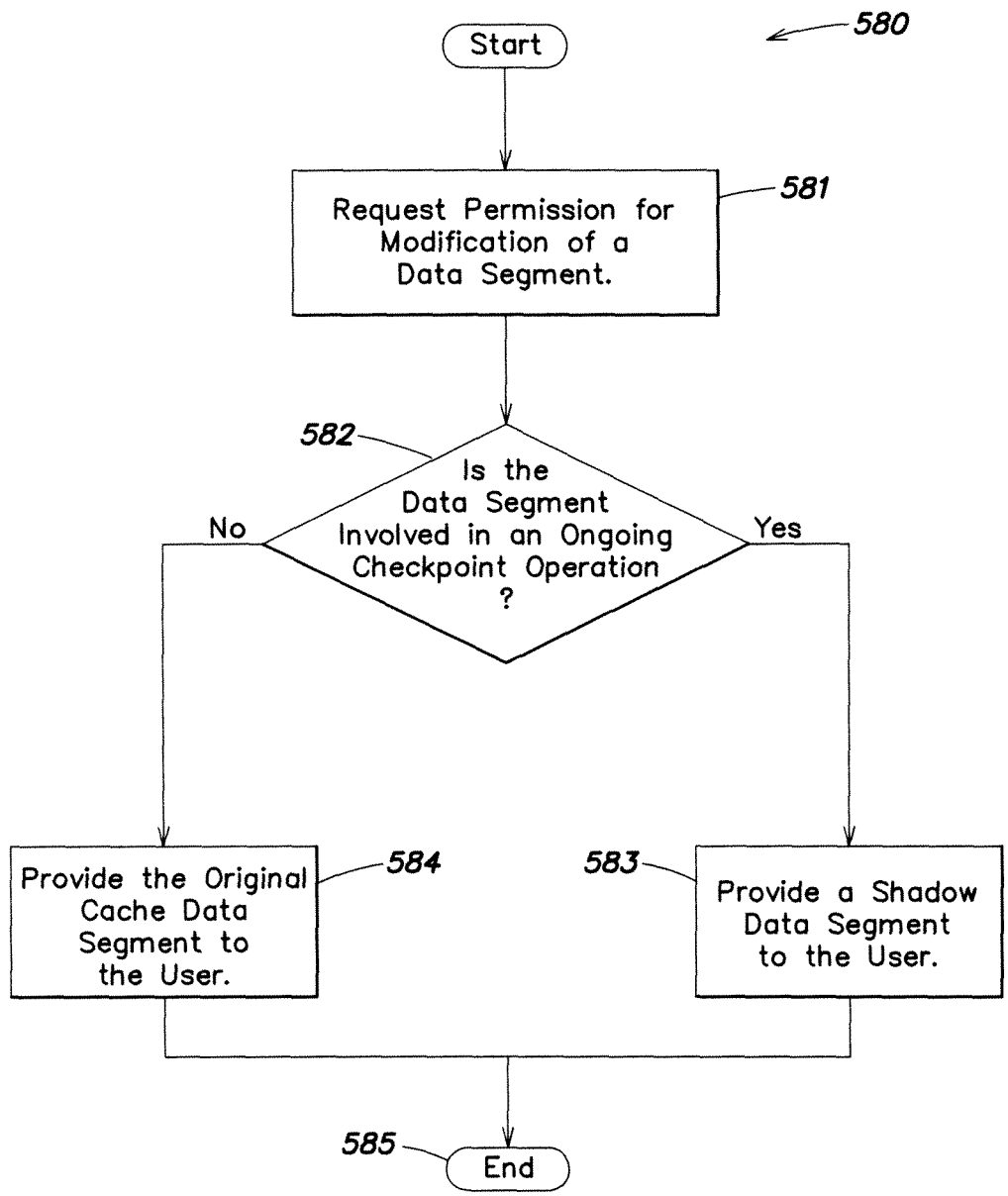
FIG. 23 is a procedure for creating a shadow data segment, in accordance with one embodiment of the invention.

As illustrated in FIG. 22, the checkpoint procedure 570 marks 571 all modified and committed data segments in the cache as being written to their final location. Then write operations 572 are generated for each of these data segments and sent to the I/O subsystem for background execution. Dedicated threads of the file system dispatch these write operations and monitor their completion. Upon completion, the said mark on the associated cache data segments is cleared 573, and users that may be blocked on accessing these data segments are awakened.

As illustrated in FIG. 22, a procedure 580 is provided for creating a shadow data segment in case other users request 581 access to a marked data segments for modification. In such cases, upon identifying the mark of data segment 582, a shadow data segment is created 583 in the cache for each required data segment that was dispatched for checkpointing, and these shadow pages are provided to the user; otherwise the original cache data segments are provided to the user 584. The contents of a shadow data segment is identical to that of the original data segment. Providing shadow data segments is done so that modification of dispatched data segments will not interfere with writing their stable contents. Upon completion of the checkpoint operation (see FIG. 22), the shadow data segments replace 574 in cache their corresponding original data segments which participated in the checkpoint. There may be also cases where users require to ensure that a dispatched data segment is written to its final location (e.g. upon transfer of data segment ownership). In such cases, these users block upon identifying this mark, and are awakened upon completion of the data segment write operation. Before termination 576, the checkpoint procedure reclaims 575 the interval in the journal that consists of the transactions whose data segments were written to their final location. This is done by updating the journal's header data segment.

Figure 24:
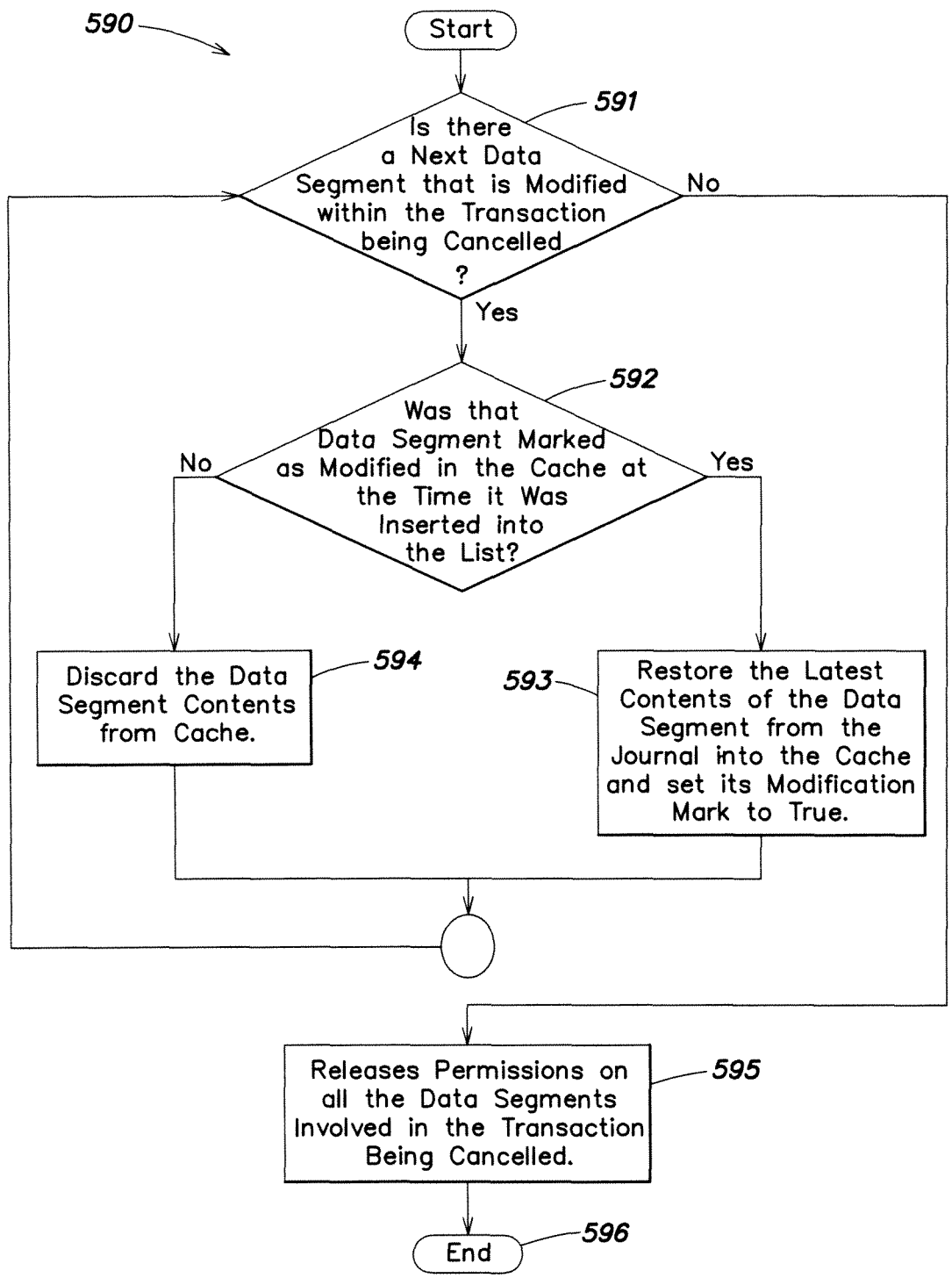
FIG. 24 is a flow diagram of a procedure for rolling-back a transaction, in accordance with one embodiment of the invention.

A procedure 590 for rolling-back an ongoing transaction (FIG. 24) restores the file system to its state before the beginning of the ongoing transaction, thus canceling the transaction and its effects on the file system. Stated generally, this procedure restores in the cache the contents of the data segments that were modified within the cancelled transaction, to their latest contents that prevailed before that transaction began. This procedure scans 591 the list of data segments modified within the ongoing transaction. Each data segment in this list may be of one of two types. A data segment of the first type is a data segment whose latest contents, before the beginning of the ongoing transaction, is located in its final location in the shared storage. A data segment of the second type is a data segment whose latest contents appears in the journal and not in its final location in the shared storage. For each data segment in the said list, the type of the data segment is known upon insertion of the data segment to the list during the transaction. If it is determined 592 that the data segment is marked as modified in the cache (i.e. its latest contents does not appear in its final location in the shared storage) during insertion into the list, then this data segment is of the second type; otherwise the data segment is of the first type. The type of each data segment is recorded in the list. All data segments in the list which are of the first type may be safely discarded 594 from the cache. For the data segments in the list which are of the second type, their latest contents is restored 593 from the journal into the cache and their modification indication is set to true (so that these data segments can be written to their final location in the shared storage). To identify the latest contents of the data segments of the second type, the roll-back procedure scans the journal (FIG. 20) from its ending to its beginning. Each data segment appearing in the journal, which also appears in the said list, is read from the journal and restored in cache, setting its modification indication to true, and its entry is removed from the list. Removal from the list is performed, since previous occurrences of that data segment in the journal are less recent, in terms of contents, than the last occurrence of that data segment in the journal, thus can be ignored. When the list is empty, the roll-back procedure releases 595 the exclusive permissions on all the data segments involved in the cancelled transaction, and terminates 596.

Figure 25:
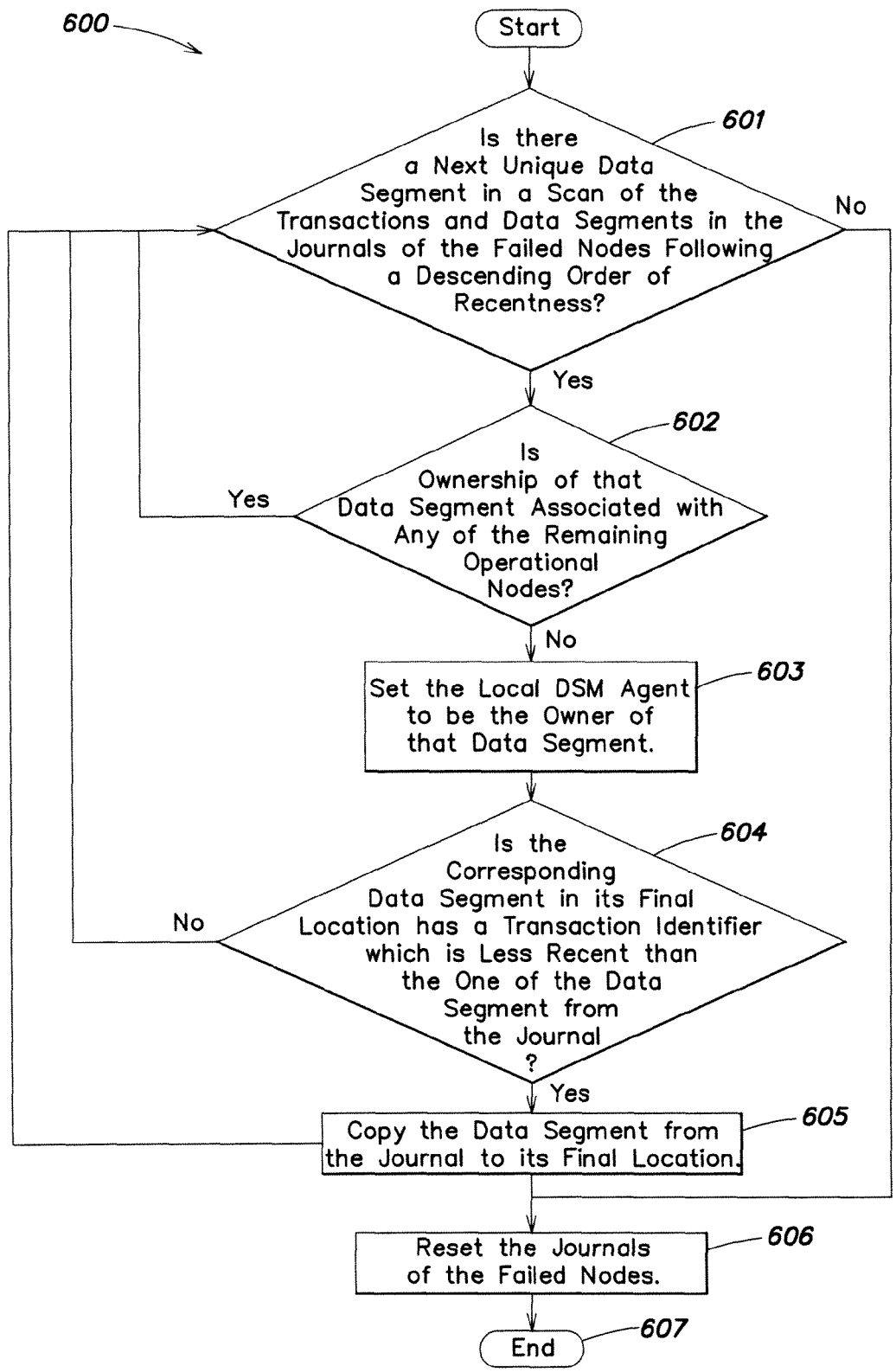
FIG. 25 is a flow diagram of a procedure for recovering committed transactions of failed nodes, in accordance with one embodiment of the invention.

A procedure 600 for recovery (FIG. 25) restores the consistency of the file system, after failure of one of more a computers in the cluster, to its most recent consistent state. In an on-line recovery procedure, a remaining operational computer in the cluster performs recovery during concurrent normal work in the cluster. In an off-line recovery procedure, an operational computer in the cluster performs recovery without concurrent normal work in the cluster. In essence, the committed transactions in the journals of the failed computers, and more precisely the latest contents of the unique data segments within the journals of the failed computers, are written to their final location in the shared storage. Recentness is compared and determined based on the transaction identifier embedded within each data segment.

The recovery procedure scans 601 concurrently the transaction journals of the failed computers, from their ending to their beginning. A journal is defined to end at its latest complete transaction (namely, an incomplete transaction is ignored). The transactions within these journals are scanned according to their order of recentness, from the most recent to the oldest, using the global and unique ordering of the transactions across the cluster. In this scan, only the most recent occurrence of each data segment is considered, by maintaining a list of data segments that were already processed, and for each data segment read from the journals, which is already in that list, the procedure ignores that occurrence of the data segment. For each occurrence of a newly processed data segment, the procedure determines if it should be copied to its final location by validating 602 that ownership of that data segment is not associated with any of the remaining operational file system agents, via the DSM component, which manages permissions and ownerships on all disk data segments. For this purpose the DSM agent broadcasts a message querying on ownership of that data segment to all operational agents, and determines whether ownership of that data segment is associated with any of the remaining operational file system agents or not according to their responses. Ownership of a data segment signifies possession of the latest contents of that data segment and responsibility of the owning file system agent to checkpoint that data segment, as specified later. If ownership is ensured to be associated with an operational file system agent, then it is guaranteed that the data segment contents as last modified by the failed file system agent was already written to its final location in the shared storage before transferring ownership. This last check enables to prevent overriding of the latest contents of a data segment already written to its final location by its operational owning file system agent, with obsolete contents held by the agent performing recovery. Since however in the off-line recovery scenario, there is no other operational agent beyond the one performing recovery, this check is not performed in the off-line scenario. For each data segment whose ownership is not associated with any of the remaining operational file system agents, the recovery procedure sets 603 the local DSM agent to be the owner of that data segment, and proceeds to check 604 if the corresponding data segment in its final location has a transaction identifier which is less recent than the one of the data segment read 605 from the journal. Only in this case the data segment read from the journal is written to its final location; otherwise it is ignored. Each data segment that should be written to its final location is recorded in a list along with a pointer to the latest contents of that data segment in the appropriate journal. Upon completion of scanning of the journals, the list of data segments that should be written to their final locations is complete. Then, the data segments recorded in this list are written to their final locations. Finally, the recovery procedure resets 606 the processed journals and terminates 607. In the on-line recovery procedure, normal activity of other users is blocked until scanning of all journals of the failed file system agents is complete, and all data segments that are candidates to be copied from the journals to their final locations have been identified, and their ownerships are reclaimed by the recovering file system agent. From that point in time, normal activity of other users is unblocked. Comparison of these candidate data segments with their associated data segments in their final location is done in the background, as well as copying the data segments in the final list to their final location. Concurrent activities of other users that may require access to these candidate data segments are blocked selectively until these data segments are either written to or identified in their final location. Candidate data segments that are required for access by concurrent activities of other users receive higher priority in the recovery process relative to other candidate data segments.

Figure 26:
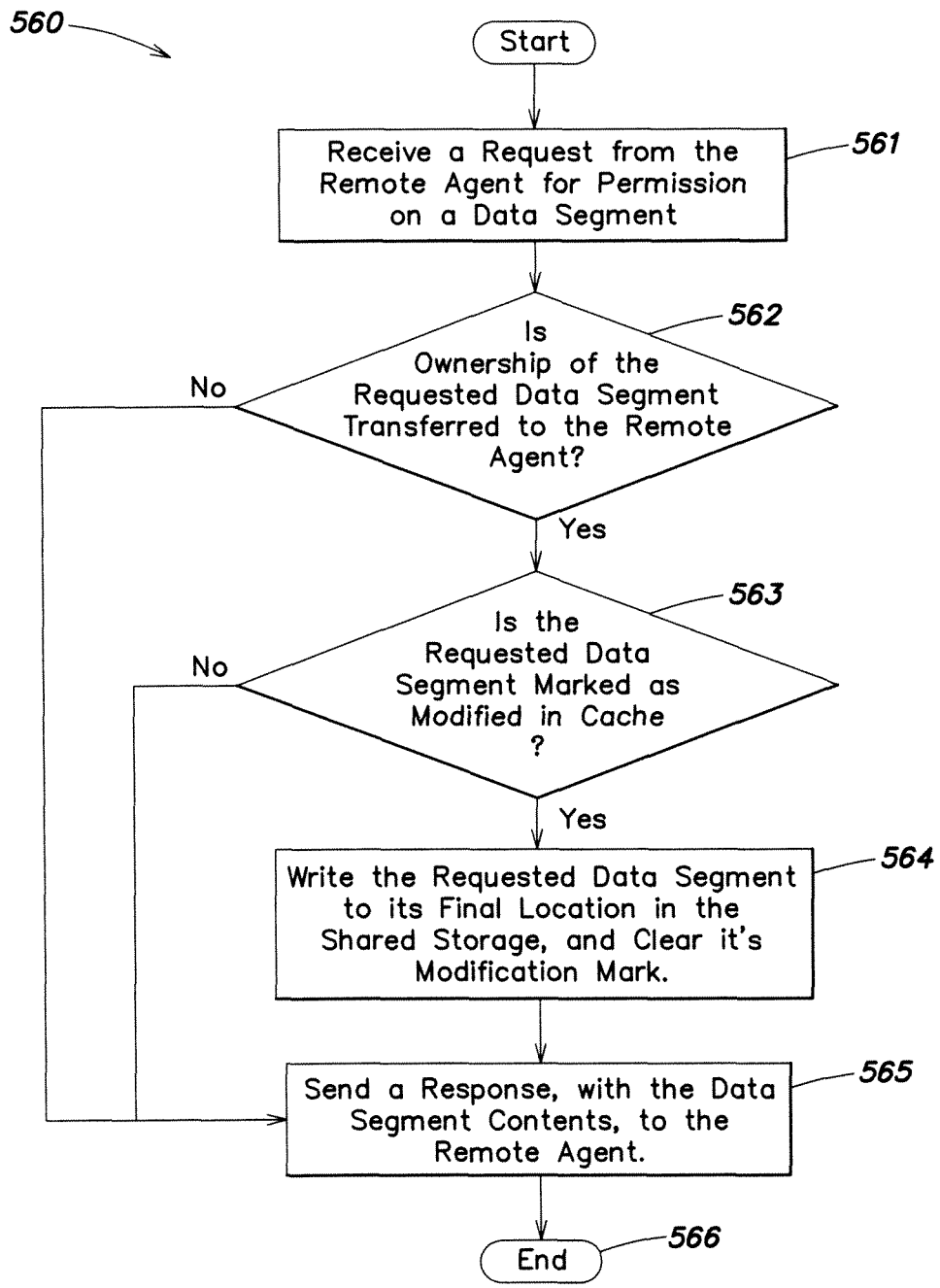
FIG. 26 is a flow diagram of a procedure for writing a data segment to its final location upon transferring ownership, in accordance with one embodiment of the invention.

One challenge for the recovery procedures within the present transaction processing method, is determining the whereabouts of the latest contents of a given data segment. Another challenge posed by the present method is parallel (concurrent) checkpoints being performed from multiple computers in the cluster to shared storage, where it is crucial that no more than one computer checkpoints the same data segment at any given time (to avoid possible overriding of the latest contents of a data segment). To facilitate both challenges efficiently, a particular logic is embedded within the DSM component in the present embodiment, as specified herewith. The basic idea is that the responsibility to checkpoint a data segment is always assigned to a single file system agent in the cluster, which is the one whose associated DSM agent is the owner of that disk data segment. To enforce these requirements, whenever a DSM agent determines that it is required to transfer ownership of a disk data segment (see steps 561-563 of FIG. 26), it first ensures that the latest contents of that data segment is written 564 to its final location in the shared storage, also clearing 564 its modification indication if it exists, and only then transfers ownership 565. Note that before this operation the latest contents of the data segment may be only in the cache and transaction journal of the owning file system agent. Also, if the current owner of a data segment has to evacuate the modified data segment from its associated cache, it writes the data segment to its final location in the shared storage.

This ensures two essential properties of the present method:

1. At concurrent checkpoints from multiple file system agents on different computers, each file system agent checkpoints different data segments (since there is a unique owner of each data segment at any given time). Moreover, for each file system agent the data segments that should be checkpointed by that file system agent are always a subset of the data segments whose latest contents are in its own transaction journal (rather than a subset of all the data segments in all the transaction journals).
2. During recovery, the data segments that should have been written to their final location but were not written due to a failure of a computer C are located only in the transaction journal associated with C. Furthermore, the data segments in the journal associated with computer C, that should indeed be written to their final location in the shared storage during recovery are those whose ownership may be associated with the file system agent on computer C (i.e. their ownership is not associated with any file system agent on any operational computer in the cluster; in the complementary case it is guaranteed that the data segment contents as last modified by the file system agent on computer C was already written to its final location in the shared storage before transferring ownership).

C-4. Summary of Transactional Processing in CFS

There has been described an efficient method for transactional processing, providing consistency and recovery, within clustered file systems, where transaction boundaries are defined by users of the file system based on user application logic. Users are provided with an interface for utilizing the transactional mechanism, namely services for opening, committing and rolling-back transactions. The operations joined into user defined transactions are on data segments within the file system. The proposed method for supporting transactional processing is integrated with a distributed shared memory technology, which facilitates efficient and coherent cache management within a clustered file system, via algorithms in both components, to enable efficient clustered processing.

C-5. System, Method and Computer Program Product

As will be appreciated by one skilled in the art, the present invention may be embodied as a system, method or computer program product. Accordingly, unless specified to the contrary, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized, unless specified to the contrary herein. The computer-usable or computer-readable medium may be, for example but not limited to, electronic, magnetic, optical, electromagnetic, infrared, or semiconductor. More specific examples (a non-exhaustive list) include: a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

By way of example only, the described embodiments of the DSM may be implemented on any cluster of x86_64 processor based servers, each having its own RAM and the servers connected via a Gbit Ethernet network using two Gbit Ethernet switches such that each server is connected to each of the switches. By way of example only, the described embodiments of the CFS with transactional processing may be implemented on any cluster of x86_64 processor based servers, each having its own cache (RAM) and sharing an external storage device. The ratio of cache size versus disk size may be tuned in order to achieve a desired level of performance, such that increasing the cache size relative to the disk size enables to increase cache hits and thus increase performance. An example of hardware configuration, enabling implementation of an enterprise class solution providing sustained high performance, utilizes x86_64 processor based servers with 32 GB RAM each, and a standard external disk array, e.g. IBM DS8000, of 1PB.

Modifications can be made to the previously described embodiments of the present invention and without departing from the scope of the invention, the embodiments being illustrative and not restrictive.

What is claimed is:

1. A method for managing global cache coherency in a distributed shared caching for clustered file systems (CFS) in a computing environment, the method comprising:
   providing the CFS for residing on a cluster of nodes for accessing space of data segments that are shared between the cluster of nodes;
   providing, in the CFS, a local cache memory of data segment slots on each of the cluster of nodes and a distributed shared memory (DSM) module, with no internal memory for the data segments on each of the cluster of nodes, wherein the cache memory acts as an external memory;
   managing access permissions to an entire space of the data segments by using the DSM module, wherein in response to receiving a request to access one of the data segments:
      performing a calculation operation for obtaining most recent contents of the one of the data segments, wherein the calculation operation performs one of:
         providing the most recent contents via communication with a remote DSM module which obtains the one of the data segments from an associated external cache memory,
         instructing by the DSM module to read from storage the one of the data segments, and
         determining that any existing contents of the one of the data segments in the local external cache are the most recent contents;
      wherein if ownership of the one of the data segments is possessed by a remote DSM module and a condition of the request to access one of the data segments is for shared permission and a current permission on the one of the data segments is shared and the one of the data segments exists in the local external cache does not exist:
         sending a response for the request to access one of the data segments to a remote DSM module; and
      determining contents of the one of the data segments are the most recent contents if ownership of the one of the data segments is possessed by a remote DSM module and the request to access one of the data segments is for shared permission and a current permission on the one of the data segments is shared and the one of the data segments exists in the local external cache.

2. The method of claim 1, further including reading from the one of the data segments if one of the DSM module instructs to read from the one of the data segments, or if any of the contents of the one of the data segments are the most recent contents, and the one of the data segments is not present in the local external cache.

3. The method of claim 1, further including reading from the one of the data segments if ownership of the one of the data segments is possessed by a local DSM module and there is no valid permission on the one of the data segments.

4. The method of claim 1, further including determining contents of the one of the data segments are the most recent contents if ownership of the one of the data segments is possessed by a local DSM module and there is a valid permission on the one of the data segments.

5. The method of claim 1, further including transporting the most recent contents of the one of the data segments within the response if the response is in a remote external cache and has a valid permission for the one of the data segments otherwise reading from the one of the data segments.

6. A system for managing global cache coherency in a distributed shared caching for clustered file systems (CFS) in a computing environment, the system comprising:
   a cluster of nodes,
   the CFS including the cluster of nodes forming a computer cluster,
   data segments shared between the cluster of nodes, wherein the CFS resides on the cluster of nodes for accessing space of data segments that are shared between the cluster of nodes,
   a distributed shared memory (DSM) module, with no internal memory for the data segments on each of the cluster of nodes within a node of the cluster of nodes;
   a plurality of storage devices in communication with the CFS,
   a local cache memory of data segment slots on each of the cluster of nodes, wherein the cache memory acts as an external memory,
   a remote cache memory within each of the cluster of nodes,
   a cache associated with the node, and
      a processor device having a memory coupled to the processor device for controlling the CFS, wherein the processor device is assigned to the node and the node is in communication with the plurality of storage devices, wherein the processor device:
         manages access permissions to an entire space of the data segments by using the DSM module, wherein in response to receiving a request to access one of the data segments:

performs a calculation operation for obtaining most recent contents of the one of the data segments, wherein the calculation operation performs one of:
provides the most recent contents via communication with a remote DSM module which obtains the one of the data segments from an associated external cache memory,
instructs by the DSM module to read from a storage device the one of the data segments, and
determines that any existing contents of the one of the data segments in the local external cache are the most recent contents;
if ownership of the one of the data segments is possessed by a remote DSM module and a condition of the request to access one of the data segments is for shared permission and a current permission on the one of the data segments is shared and the one of the data segments exists in the local external cache does not exist:
sends a response for the request to access one of the data segments to a remote DSM module; and
determines contents of the one of the data segments are the most recent contents if ownership of the one of the data segments is possessed by a remote DSM module and the request to access one of the data segments is for shared permission and a current permission on the one of the data segments is shared and the one of the data segments exists in the local external cache.

7. The system of claim 6, wherein the processor device reads from the one of the data segments if one of the DSM module instructs to read from the one of the data segments, if any of the contents of the one of the data segments are the most recent contents, and the one of the data segments is not present in the local external cache.

8. The system of claim 6, wherein the processor device reads from the one of the data segments if ownership of the one of the data segments is possessed by a local DSM module and there is no valid permission on the one of the data segments.

9. The system of claim 6, wherein the processor device determines contents of the one of the data segments are the most recent contents if ownership of the one of the data segments is possessed by a local DSM module and there is a valid permission on the one of the data segments.

10. The system of claim 6, wherein the processor device transports the most recent contents of the one of the data segments within the response if the response is in a remote external cache and has a valid permission for the one of the data segments otherwise reading from the one of the data segments.

11. A computer program product for managing a global cache coherency in a distributed shared caching for clustered file systems (CFS) using a processor device, the computer program product comprising a non-transitory computer-readable storage medium having computer-readable program code portions stored therein, the computer-readable program code portions comprising:
an executable portion that provides the CFS for residing on a cluster of nodes for accessing space of data segments that are shared between the cluster of nodes;
an executable portion that provides, in the CFS, a local cache memory of data segment slots on each of the cluster of nodes and a distributed shared memory (DSM) module, with no internal memory for the data segments on each of the cluster of nodes, wherein the cache memory acts as an external memory; and
an executable portion that manages access permissions to an entire space of the data segments by using the DSM module, wherein in response to receiving a request to access one of the data segments:
performs a calculation operation for obtaining most recent contents of the one of the data segments, wherein the calculation operation performs one of:
provides the most recent contents via communication with a remote DSM module which obtains the one of the data segments from an associated external cache memory,
instructs by the DSM module to read from a storage device the one of the data segments, and
determines that any existing contents of the one of the data segments in the local external cache are the most recent contents;
if ownership of the one of the data segments is possessed by a remote DSM module and a condition of the request to access one of the data segments is for shared permission and a current permission on the one of the data segments is shared and the one of the data segments exists in the local external cache does not exist:
sends a response for the request to access one of the data segments to a remote DSM module; and
an executable portion that determines contents of the one of the data segments are the most recent contents if ownership of the one of the data segments is possessed by a remote DSM module and the request to access one of the data segments is for shared permission and a current permission on the one of the data segments is shared and the one of the data segments exists in the local external cache.

12. The computer program product of claim 11, further including an executable portion that reads from the one of the data segments if one of the DSM module instructs to read from the one of the data segments, if any of the contents of the one of the data segments are the most recent contents, and the one of the data segments is not present in the local external cache.

13. The computer program product of claim 11, further including an executable portion that reads from the one of the data segments if ownership of the one of the data segments is possessed by a local DSM module and there is no valid permission on the one of the data segments.

14. The computer program product of claim 11, further including an executable portion that determines contents of the one of the data segments are the most recent contents if ownership of the one of the data segments is possessed by a local DSM module and there is a valid permission on the one of the data segments.

15. The computer program product of claim 11, further including an executable portion that transports the most recent contents of the one of the data segments within the response if the response is in a remote external cache and has a valid permission for the one of the data segments otherwise reading from the one of the data segments.

* * * * *